US012809932B2

(12) United States Patent
Chandra et al.

(10) Patent No.: US 12,809,932 B2
(45) Date of Patent: Nov. 24, 2026

(54) STATE-SHARING BETWEEN MICRO-FRONTEND WEB APPLICATIONS ACROSS MULTIPLE BROWSER TABS

(71) Applicant: T-Mobile Innovations LLC, Overland Park, KS (US)

(72) Inventors: Krishna Chandra, Black Diamond, WA (US); Tanmaya Gaur, Kirkland, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 202 days.

(21) Appl. No.: 18/777,406

(22) Filed: Jul. 18, 2024

(65) Prior Publication Data

US 2026/0023804 A1 Jan. 22, 2026

(51) Int. Cl.
*G06F 16/957* (2019.01)
*G06F 3/0483* (2013.01)
(Continued)

(52) U.S. Cl.
CPC .......... *G06F 16/957* (2019.01); *G06F 3/0483* (2013.01); *G06F 16/954* (2019.01); *G06F 16/958* (2019.01); *G06F 2203/04803* (2013.01)

(58) Field of Classification Search
CPC ............................. G06F 16/957; G06F 3/0483
See application file for complete search history.

(56) References Cited

U.S. PATENT DOCUMENTS 8,225,191 B1 7/2012 Kalman
8,984,409 B2 * 3/2015 Casalaina ......... G06F 16/24575 715/738
(Continued)

FOREIGN PATENT DOCUMENTS

EP 4700579 A1 2/2026

OTHER PUBLICATIONS

Dragosgn on Stack Overflow, "How do you share state in a micro-frontend scenario?", Mar. 5, 2020 , 4 pages, https://stackoverflow.com/questions/60548251/how-do-you-share-state-in-a-micro-frontend-scenario (Year: 2020).*
(Continued)

*Primary Examiner* — Benjamin Smith

(57) ABSTRACT

A method implemented in a retail service system to provide customer services. The method includes loading, by an application on a mobile communication device, a first browser tab comprising a first web application, a first state-sharing application, and a first state store for storage of state information associated with a specific customer account, wherein the loading comprises transmitting, by the application to the first browser tab, customer information associated with the specific customer account; and translating, by the first state-sharing application of the first browser tab, the customer information into the state information; loading, by the first browser tab, a second browser tab comprising a second web application, a second state-sharing application, and a second state store for storage of the state information associated with the specific customer account; and exchanging, by the first state-sharing application and the second state-sharing application, updated state information associated with the specific customer account.

20 Claims, 10 Drawing Sheets

(51) Int. Cl.
*G06F 16/954* (2019.01)
*G06F 16/958* (2019.01)

(56) References Cited

U.S. PATENT DOCUMENTS

| | | | | |
|---|---|---|---|---|
| 9,417,759 | B1 * | 8/2016 | Srinivasan | G06F 3/0483 |
| 10,193,950 | B2 * | 1/2019 | Numata | H04L 67/02 |
| 10,678,600 | B1 * | 6/2020 | Darling | G06F 8/36 |
| 10,715,563 | B1 * | 7/2020 | Sutherland | H04L 41/0253 |
| 10,769,233 | B2 * | 9/2020 | Vaidya | G06F 3/0483 |
| 10,938,755 | B1 * | 3/2021 | MacMillin | G06F 9/542 |
| 11,137,887 | B1 * | 10/2021 | Garibaldi | G06F 16/9574 |
| 11,170,065 | B2 * | 11/2021 | Tank | G06F 16/9577 |
| 11,256,772 | B2 * | 2/2022 | Shah | G06F 16/957 |
| 11,375,011 | B2 * | 6/2022 | Ng | G06F 16/951 |
| 11,689,627 | B1 * | 6/2023 | Doman | H04L 67/146 709/219 |
| 11,778,045 | B2 * | 10/2023 | Bakos | H04L 67/02 709/203 |
| 12,254,502 | B2 * | 3/2025 | Sharpe | G06F 16/954 |
| 12,346,394 | B1 * | 7/2025 | Crislip | G06F 16/9535 |
| 2010/0268694 | A1 * | 10/2010 | Denoue | G06F 16/954 707/693 |
| 2016/0134681 | A1 * | 5/2016 | Numata | G06F 16/954 709/218 |
| 2016/0313880 | A1 * | 10/2016 | Godewyn | G06F 16/95 |
| 2017/0171318 | A1 | 6/2017 | Levithan | |
| 2018/0322216 | A1 * | 11/2018 | Vaidya | G06F 9/451 |
| 2019/0238635 | A1 * | 8/2019 | Ng | G06F 16/954 |
| 2020/0228577 | A1 * | 7/2020 | Sutherland | H04L 41/0253 |
| 2020/0285516 | A1 * | 9/2020 | Darling | G06F 9/547 |
| 2021/0232644 | A1 * | 7/2021 | Shah | G06F 16/957 |
| 2021/0248205 | A1 * | 8/2021 | Tank | G06F 16/986 |
| 2023/0009811 | A1 * | 1/2023 | Bakos | H04L 67/02 |
| 2024/0152987 | A1 * | 5/2024 | Sharpe | G06F 16/954 |
| 2024/0220343 | A1 * | 7/2024 | Rao | G06F 16/9577 |
| 2024/0330021 | A1 * | 10/2024 | Dominguez | H04L 67/02 |
| 2024/0406247 | A1 * | 12/2024 | Boudreau | G06F 9/451 |
| 2025/0053990 | A1 * | 2/2025 | Bailey | G06Q 40/03 |
| 2026/0023804 | A1 * | 1/2026 | Chandra | G06F 9/546 |

OTHER PUBLICATIONS

Florian Rappl, "Communication Between Micro Frontends", Mar. 10, 2020, 24 pages, https://dev.to/florianrappl/communication-between-micro-frontends-41fe (Year: 2020).*

Foreign communication from related application—European Extended Search Report and Search Opinion dated Jan. 6, 2026 regarding EP Application No. 25187975.5 filed Jul. 7, 2025 13 pages.

* cited by examiner

600

STATE-SHARING BETWEEN MICRO-FRONTEND WEB APPLICATIONS ACROSS MULTIPLE BROWSER TABS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Many products and services involve a complex network of relationships. Businesses and/or organizations may utilize enterprise software to advance their business objectives and/or fulfil their business operations. Some examples of business operations may include, but are not limited to, customer billing, payment, access authorization, product shipment, service fulfillment, and customer support solutions. A computer-based network can facilitate the implementation of such business operations. In one implementation, business operations may be implemented as backend services (e.g., hosted on servers), and users may access the backend services via frontend applications (e.g., a client application or a web browser executing on a client computing system or device).

SUMMARY

In an embodiment, a method implemented in a retail service system to provide customer services on a mobile communication device using a native operating system (OS) application that loads multiple browser tabs with state-sharing between micro-frontend web applications across the multiple browser tabs is disclosed. The method includes loading, by the native OS application on the mobile communication device, a first browser tab comprising at least a first micro-frontend web application associated with a first customer relationship management (CRM) operation, a first state-sharing application, and a first state store for storage of state information associated with a specific customer account, wherein the loading comprises transmitting, by the native OS application to the first browser tab, customer information associated with the specific customer account; and receiving, by the first state-sharing application of the first browser tab, the customer information; translating, by the first state-sharing application of the first browser tab, the customer information into the state information associated with the specific customer account; loading, by the first browser tab, a second browser tab comprising a child-parent relationship with the first browser tab, wherein the second browser tab comprises at least a second micro-frontend web application associated with a second CRM operation, a second state-sharing application, and a second state store for storage of the state information associated with the specific customer account; executing the first micro-frontend web application based on the state information in the first state store; executing the second micro-frontend web application based on the state information in the second state store; and exchanging, by the first state-sharing application of the first browser tab and the second state-sharing application of the second browser tab, updated state information associated with the specific customer account.

In another embodiment, a method implemented in a service provider system to provide state information sharing between micro-applications across multiple browser tabs is disclosed. The method includes loading, by a client application implemented on a computer system, a first browser tab comprising at least one first micro-application, a first state-sharing application, and a tab loading application to be executed within the first browser tab, wherein the loading comprises creating, by the first state-sharing application, a first state store to store state information associated with a specific customer account; loading, by the tab loading application of the first browser tab, a second browser tab having a parent-child relationship with the first browser tab, wherein the second browser tab comprises at least one second micro-application and a second state-sharing application to be executed within the second browser tab, wherein the loading the second browser tab comprises transmitting, by the first state-sharing application of the first browser tab to the second browser tab, a message including the state information at the first state store; receiving, by the second state-sharing application of the second browser tab from the first browser tab, the state information; creating, by the second state-sharing application of the second browser tab, a second state store to store the received state information; updating, by the first micro-application of the first browser tab, based on an execution of the first micro-application, the first state store with first updated state information; updating, by the second micro-application of the second browser tab, based on an execution of the second micro-application, the second state store with second updated state information; exchanging, by the first state-sharing application of the first browser tab and the second state-sharing application of the second browser tab, the first updated state information and the second updated state information; and rendering, by the client application, on one or more display devices of the computer system, a user interface including information associated with the execution of the first micro-application of the first browser tab and the execution of the second micro-application of the second browser tab.

In yet another embodiment, a method implemented in a customer relationship management (CRM) system to provide efficient state information sharing between micro-frontend web applications across multiple tabs of a single web browser is disclosed. The method includes instantiating, by an application associated with a parent tab of a web browser on a computer system, a child tab in the web browser, wherein each of the parent tab and the child tab comprises a state-sharing application, at least one micro-frontend web application that implements a CRM operation, and an individual state store for storage of state information associated with a specific customer account, wherein the instantiating comprises transmitting, by the parent state-sharing application associated with the parent tab to the child tab, the state information associated with the specific customer account stored in the parent state store associated with the parent tab; receiving, by the child state-sharing application associated with the child tab, the state information; storing, by the child state-sharing application, the received state information in the child state store associated with the child tab; displaying, via a user interface (UI) of the computer system, the parent tab and the child tab simultaneously within the web browser, wherein each of the parent tab and the child tab includes one or more interactive areas associated with the at least one micro-frontend web application of the respective tab; detecting, by the parent state-sharing application, an update in the state information at the parent state store; transmitting, by the parent state-sharing application to the child tab, based on the detected update, updated state information from the parent state store; receiving, by the child state-sharing application from the parent tab, the updated state information; updating, by the child state-sharing application, the child state store based on the received updated state information; and executing the at least one micro-frontend web application of the child tab based at least in part on the updated state information in the child state store.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, where like reference numerals represent like parts.

DETAILED DESCRIPTION

Figure 1:
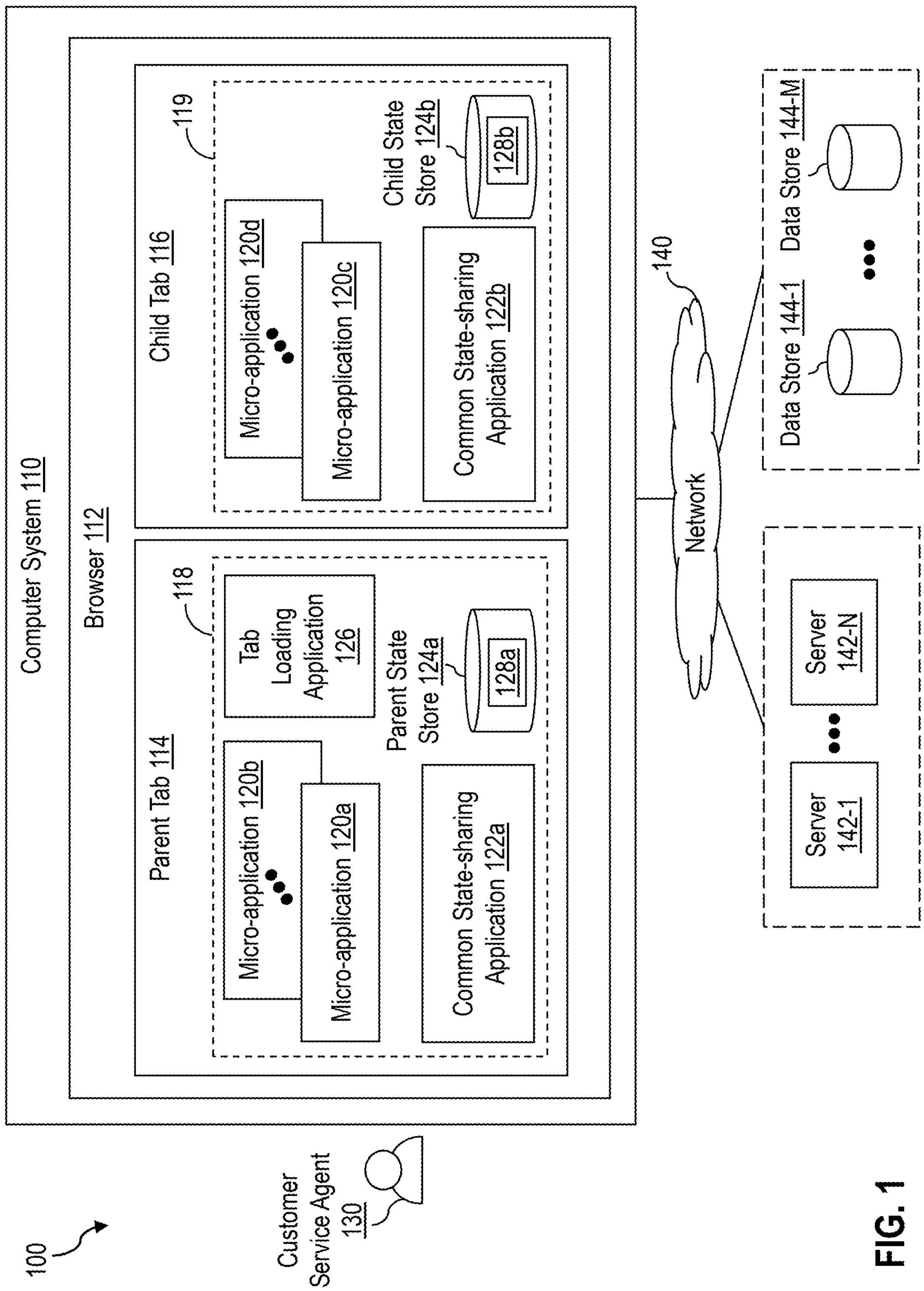
FIG. 1 is a block diagram of a network system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A service provider may provide services (e.g., customer billing, payment, access authorization, product shipment, service fulfillment, customer support solutions, etc.) to users using a combination of backend and frontend implementations as discussed above. The term "backend" refers to the infrastructure (e.g., servers and data stores) that operate to deliver information and services to the users. The term "frontend" refers to the user interface (e.g., visual elements such as buttons, checkboxes, graphics, and texts) that allows a user to interact with the services. In an example, the user interface may be a web browser.

A mobile service provider may provide mobile services to customers (for wireless communications). The mobile service provider may implement a customer relationship management (CRM) system to manage interactions with customers, customer service representatives or agents who assist and service customers, and/or sales representatives at retail stores. The CRM system may be implemented using a combination of backend services and frontend applications. The backend services may include identity management, billing, payment, and/or various utilities to facilitate troubleshooting of problems or issues (e.g., network connection issues) experienced by customers. The frontend applications may include customer facing web applications for interactions with customers, internal web applications for interactions with customer service agents, and/or native applications on mobile communication devices (e.g., tablets) for interactions with sales representatives at retail stores.

In an example, a customer service agent may receive a call from a customer experiencing a slow network connection. To troubleshoot the causes of the slow network connection, the customer service agent may use a web browser to navigate to a service plan web page (hosted on a web server of the CRM system) to determine the service plan subscribed by the customer. If the customer has already subscribed to a high-speed data plan (e.g., with fifth generation (5G) access), the customer service agent may navigate to a customer usage web page (hosted on a web server of the CRM system) to determine whether the customer has reached the maximum data usage. For instance, the high-speed data plan may allow for a limited amount of data usage (e.g., 5 gigabytes of data) and may drop to a slower connection speed after the customer has reached the data usage limit. If the customer has not reached the maximum data usage, the customer service agent may navigate to a device web page (hosted on a web server of the CRM system) to determine whether the customer's device (e.g., a mobile phone, a smartphone, a tablet, and/or the like) is compatible with operations at the high network connection speed provided by the subscribed service plan. If the customer's mobile device is compatible with operations at the high network connection speed, the customer service agent may navigate to a network coverage web page (hosted on a web server of the CRM system) to determine whether the customer is in an area with a poor network coverage (e.g., with a weak radio signal strength). In an example, each of these web pages may be opened in a different browser tab within a web browser, and the customer service agent may view and interact with one browser tab at a time. In some implementations, each browser tab may include a container executing within an environment of the browser tab, where the container may include application codes and data that generate user interface elements for display and interaction with web content.

In some cases, the customer service agent may have to navigate back and forth between the service plan web page, the customer usage web page, the device web page, and the network coverage web page (e.g., by switching from one tab to another tab in the web browser) to troubleshoot the slow network connection issue. Accordingly, it may be desirable for the customer service agent to view all these web pages at the same time (e.g., on a single web page) without having to navigate back and forth between those web pages.

One way to allow a user to view multiple web pages at the same time while also providing flexibility and scalability is to use a modular implementation approach, where each web page is implemented as an individual micro-frontend web application and various combinations of micro-frontend web applications can be integrated or bundled at runtime to function like a single large web application (e.g., a single web page). In general, any business operational and/or service functionality can be divided into different modules or individual functions (e.g., micro-frontend web application), implemented autonomously and loaded within a container that provides state-sharing among the loaded functions.

As used herein, a micro-frontend web application may include executable computer functionality that is available as a service and exposed programmatically via web protocols (e.g., hypertext transfer protocol (HTTP) and/or hypertext transfer protocol secure (HTTPS)) and other protocols. A micro-frontend web application may be configured to perform a set of defined functions for interactions with backend services. For instance, a micro-frontend web application may generate a graphical user interface (GUI) that displays information (e.g., web content) in response to a user input or provides a specific way for a user to interact with the web content.

The terms "micro-frontend web applications," "micro-frontend applications," and "micro-applications," may be used interchangeably herein, such that a description referring to one of the terms shall be treated as though the description also referred to the other term.

In some cases, providing a large amount of information on a single web page can cause cognitive overload. Thus, it may be desirable for a user to view and interact with multiple web pages at the same time, but across different browser tabs and/or different display devices (e.g., monitors). Referring to the slow connection speed troubleshooting example discussed above, the service plan and the customer usage web pages (micro-applications) may be loaded on one browser tab (e.g., a parent tab) of a web browser, and the device and network coverage web pages (the micro-applications) may be loaded on another browser tab (e.g., a child tab loaded by the parent tab) of the same web browser. By splitting up the execution of the service plan micro-application, the customer usage micro-application, the device micro-application, and the network coverage micro-application across multiple browser tabs, there is a need to share state information across the browser tabs as applications may have states and those states may change.

Loading or instantiating a browser tab may refer to creating a software instance of a tab, which may include allocating memory and computing resources for storing and executing micro-application codes and/or scripts to be dynamically requested, for example, from a server.

The term "parent tab" and "child tab" may refer to browser tabs that have a parent-child relationship. While the micro-applications in the parent tab and the child tab are independent of each other and may be called independently, the micro-applications may have to share state information (e.g., customer account information) so that all the micro-applications may retrieve and interact with web content for the same customer account or the same customer account attribute(s) (e.g., a particular phone line under the customer account). In an example, a parent-child relationship exists between a parent tab and a child tab when the parent tab is opened or loaded by the browser independent of any other browser tabs (if any) in the browser, and the child tab is loaded by the parent tab. A parent tab may generally load any suitable number of child tabs (e.g., 1, 2, 3 or more).

In an example, the customer may have an account with four phone lines, e.g., a first phone line for dad, a second phone line for mom, and two other phone lines for kids. The troubleshooting may be for a specific phone line (e.g., the first phone line) under the customer account. As such, each of the service plan, the customer usage, the device, and the network coverage micro-applications may retrieve and interact with data associated with the first phone line. If the troubleshooting switches to a different phone line (e.g., the second phone line), each of the service plan, the customer usage, the device, and the network coverage micro-applications may have to switch to retrieve and interact with data for the second phone line. As such, there is a need to share information (e.g., state information) across multiple browser tabs.

In another example, a customer service agent may commonly assist two different customers at the same time. Thus, it may be desirable for the customer service agent to view and interact with multiple browser tabs associated with the two customers at the same time. For instance, the customer service agent may open two browser tabs (e.g., a first parent tab and a first child tab) to access information for one customer and open another two browser tabs (e.g., a second parent tab and a second child tab) to access information for another customer. As such, there is a further need to be able to isolate information between browser tabs that are associated with different customers.

There is no existing mechanism that allows a parent tab and a corresponding child tab to each read and write to a data storage or allow different parent tabs to have separate data storages without complex handling. Further, each micro-frontend web application may have different ways (e.g., using custom codes) of handling maintenance, updates, and posting of state information. Implementing custom codes at each micro-frontend web application for state information handling and sharing can be time and resource intensive.

The present disclosure provides a technical solution to the aforementioned technical problems in the technical field of sharing information (e.g., state information) across multiple browser tabs within a single web browser. The present disclosure provides efficient and flexible techniques for a parent tab and corresponding child tabs (e.g., a set of parent-child tabs having a parent-child relationship) in a web browser to share state information with each other. In particular, a set of parent-child tabs have read and write accesses to data storages (e.g., for state-sharing), but data storages between different sets of parent-child tabs in the web browser are isolated (i.e., no sharing across different sets of parent-child tabs). For example, each of the parent tab and corresponding child tabs may execute micro-frontend web applications, and an individual state store may be created and maintained at each of the parent tab and corresponding child tabs. Each micro-frontend web application may be executed based on state information (e.g., customer account information) stored in a respective tab (e.g., a parent tab or a child tab). The state information in each respective state store may change (e.g., due to a user input or an execution of a micro-frontend web application in a respective tab). To share state information across the parent tab and corresponding child tabs, a change in state information stored at the parent tab's state store may be propagated to each of the child tabs' state stores and an event may be posted (e.g., via a function call) to each of the micro-frontend web applications in each of the child tab to notify of the respective state change. In a similar way, a change in state information stored at one of the child tabs' state stores may be propagated to each of the other child tabs' state stores and the parent tab's state store and an event may be posted to each of the micro-frontend web applications in each of the other child tab and the parent to notify of the respective state change. As such, each micro-frontend web application executing in a parent tab or a child tab may access the state store in the respective tab to obtain the latest state information (that is consistent across all parent and corresponding child tabs). To avoid including custom codes in each micro-frontend web application for state handling, each tab (e.g., a parent tab or a child tab) may execute a common state-sharing application to uniformly handle maintenance and updates at the respective state store and posting of state changes to other associated tabs. Further, the sharing of state information may be limited to within a set of parent-child tabs (having a parent-child relationship) and not across different sets of parent-child tabs.

According to an embodiment of the present disclosure, a frontend of a CRM system may be implemented on a computer system (e.g., a client computer system). The frontend may include a browser (e.g., a software application, a client application). The browser may include a parent tab and a child tab. The computer system may include processor(s) and non-transitory memory. The browser may include instructions stored at the non-transitory memory and executable by the processor(s). The parent tab and child may include instructions, codes, and/or scripts that are loaded dynamically at runtime and stored at the non-transitory memory for execution by the processor(s).

Each of the parent tab and the child tab may execute micro-frontend web applications to generate user interface elements to display and interact with web content associated with CRM operations. The CRM operations may be related to, for example, but are not limited to, retrieving and/or interacting with information or data associated with billing, payment, product shipment, service fulfilment, and/or customer support for a specific customer account. Executions of the micro-frontend web applications may generate and/or modify state information. The state information may include, for example, but is not limited to, the specific customer's account number, the number of phone lines under the account, the phone numbers associated with the phone lines, the subscribed service plan, billings, payments, and any other information related to the customer account. The micro-frontend web applications may be agnostic to whether the respective micro-frontend web application is executing in a parent tab or in a child tab.

To share state information across the parent tab and the child tab, each of the parent tab and the child tab may include an individual state store to store state information associated with the specific customer account and execute a state-sharing application to share the state information with each other. To allow for uniform state information handling across all tabs, the state-sharing application of the parent tab and the state-sharing application of the child tab may share common programming codes. Further, the state store in the parent tab and the state store in the child tab may store state information using a similar data structure. For instance, a child tab's state store may be a copy of the parent tab's state store.

In an embodiment, the child tab may be loaded or instantiated by the parent tab. For instance, the parent tab may further include a tab loading application to load the child tab. The loading of the child tab may be in response to a user input. To promote state sharing, as part of loading the child tab, the parent tab's state-sharing application may transmit, to the child tab, the state information associated with the specific customer account stored at the parent tab's state store. For instance, the parent tab's state-sharing application may create a state object (e.g., a data object) including the state information (e.g., all the state information or at least relevant state information) stored at the parent tab's state store and provide the state object to the child tab. The child tab's state-sharing application may receive the state information, create a state store (e.g., the child tab's state store), and store the received state information in the child tab's state store. The computer system may include a user interface to display the parent tab and the child tab simultaneously within the browser. In an embodiment, the displaying the parent tab and the child tab simultaneously may include displaying the parent tab on a first display device of the computer system and displaying the child tab on a second display device of the computer system different than the first display device.

The micro-frontend web applications of the parent tab may execute based on the state information in the parent tab's state store. Similarly, the micro-frontend web applications of the child tab may execute based on the state information in the child tab's state store. The execution of the parent tab's micro-frontend web applications or a user input (via the browser) can change the state information in the parent tab's state store. For instance, the state-sharing application of the parent tab may detect an update (e.g., a first update) in the state information stored at the parent tab's state store. In an embodiment, the state information stored at the parent tab's state store includes a field or attribute of the specific customer account (e.g., a number of phone line field indicating 2 phone lines), and the detecting the update at the state information stored at the parent tab's state store is associated with an update to the attribute of the specific customer account (e.g., the number of phone line field indicating 3 phone lines due to an added phone line to the specific customer account).

In response to the detected update, the parent tab's state-sharing application may transmit, to the child tab, first updated state information (e.g., only the portion of the state information that has changed) from the parent tab's state store. As an example, the state information at the parent tab's state store may include full account information (e.g., billing account number, primary account holder name, number of phone lines, phone number for each phone line, service plan, customer usage, etc.) of the specific customer account. Referring to the example where an additional phone line is added to the specific customer account, the first update state information may include information associated with the newly added phone line (e.g., the number of phonelines field which is increased by one and an additional phone number field indicating phone number for the additional phone line) and not the full account information of the specific customer account.

The child tab's state-sharing application may monitor for state information updates from the parent tab. Based on the monitoring, the child tab's state-sharing application may receive the first updated state information. Upon receiving the first updated state information, the child tab's state-sharing application may update the child tab's state store based on the received first updated state information (e.g., storing the first updated state information in the child tab's state store). The child tab's state-sharing application may post, to the child tab's micro-frontend web applications, an event indicating an update at the child tab's state store. Subsequently, the child tab's micro-frontend web applications may execute based on the first updated state information at the child tab's state store.

Similarly, the execution of the child tab's micro-frontend web applications or a user input (via the browser) can change state information in the child tab's state store. For instance, the state-sharing application of the child tab may detect an update (e.g., a second update) in the state information stored at the child tab's state store. In response to the detected second update at the child tab's state store, the child tab's state-sharing application may transmit, to the parent tab, second updated state information (e.g., only the portion of the state information that has changed) from the child tab's state store. The parent tab's state-sharing application may monitor for state information updates from the child tab. Based on the monitoring, the parent tab's state-sharing application may receive the second updated state information. Upon receiving the second updated state information, the parent tab's state-sharing application may update the parent tab's state store based on the received second updated state information (e.g., storing the second updated state information in the parent tab's state store). The parent tab's state-sharing application may post, to the parent tab's micro-frontend web applications, an event indicating an update at the parent tab's state store. Subsequently, the parent tab's micro-frontend web applications may execute based on the second updated state information at the parent tab's state store.

In some cases, customer services may be provided in a retail service system via a mobile communication device (e.g., a tablet). According to another embodiment of the present disclosure, a native application (e.g., a client application that is a non-browser application) on the mobile communication device may leverage the CRM frontend implementation discussed above to service customers (e.g., at a retail store). In an embodiment, the native application may load a first browser tab (e.g., a parent tab) including first micro-frontend web applications associated with CRM, a first state-sharing application, and a first state store to store state information associated with a specific customer account. As part of loading the first browser tab, the native application may transmit, to the first browser tab, customer information associated with the customer account. The first state-sharing application of the first browser tab may receive the customer information and may translate the customer information into the state information associated with the customer account (e.g., based on certain business logics or mapping rules). For instance, the CRM system may verify a customer identity in one way (e.g., via a personal identification number (PIN) code), and the retail service system may verify a customer identity in another way (e.g., via a customer trust score, which may be a combination of a PIN code and a primary account holder name, etc.).

After the first browser tab is loaded, the first browser tab may load a second browser tab (e.g., a child tab) having a child-parent relationship with the first browser tab. The second browser may include second micro-frontend web applications associated with CRM, a second state-sharing application, and a second state store to store the state information associated with the customer account. The first micro-frontend web applications of the first browser tab may be executed based on the state information in the first browser tab's state store. Similarly, the second micro-frontend web applications of the second browser tab may be executed based on the state information in the second browser tab's state store. Further, the first state-sharing application of the first browser tab and the second state-sharing application of the second browser tab may exchange state information updates associated with the customer account based on execution of respective first micro-frontend web applications and second micro-frontend web applications.

Providing state information sharing between micro-frontend web applications across browser tabs allows a user to view and interact with multiple different web content (provided by the micro-frontend web applications) related to the same customer at the same time across the browser tabs without having to manually enter the customer's account information to each of the micro-frontend web application. For instance, the user may input a customer account information field to one of the micro-frontend web applications, and the customer account information field may be propagated to each micro-frontend web application in each browser tab. This can save time and reduce human errors. Limiting state information sharing to be between browser tabs that have a parent-child relationship allows a customer service agent to service multiple customers at the same time using multiple browser tabs with state information of different customers being isolated from each other (e.g., providing a secure execution environment). Utilizing common codes for state sharing allows for uniform state handling across browser tabs and across micro-frontend web applications. While the present disclosure is discussed in the context of a CRM frontend for a mobile service provider, the mechanisms for sharing state information between micro-frontend web applications across multiple browser tabs within a single browser may be applied to any web frontend system of any business or organization.

Turning now to FIG. 1, a network system 100 is described. The network system 100 may be utilized for CRM by a mobile service provider that provides mobile services to customers (for wireless communications). The network system 100 includes a computer system 110 (e.g., utilized by a customer service agent 130 to service customers), a network 140, N number of servers 142 (individually shown as 142-1 to 142-N, where N may be any suitable integer value), and M number of data stores 144 (individually shown as 144-1 to 144-M, where M may be any suitable integer value).

The network 140 promotes communication between the components of the network system 100. The network 140 may be any communication network including a public data network (PDN), a public switched telephone network (PSTN), a private network, and/or a combination.

The computer system 110 may be referred to as a client computer system. The computer system 110 may be a desktop computer, a laptop computer, a notebook computer, a tablet, etc. The computer system 110 may include at least one non-transitory memory and one or more processors. The computer system 110 may include a browser 112 (which is a software application) including program codes or instructions stored in the non-transitory memory of the computer system 110 and executed by the one or more processors of the computer system 110 to perform CRM frontend operations discussed herein. The browser 112 may include multiple browser tabs.

A web browser (or browser) is a software application commonly used by users to access and interact with web applications over a network (e.g., the Internet). For instance, a browser may include software codes or components (e.g., a rendering engine) that generate a user interface (UI) (e.g., a graphical user interface (GUI)) to allow users to interact with the web applications web content using visual elements such as navigation bars, buttons, menus, and windows.

A browser tab is a GUI within a browser and may correspond to a web page. For instance, a user may enter a uniform resource locator (URL) in an address bar of the browser to access a web page stored at a location identified by the URL. A web page is a document, for example, written in hypertext markup language (HTML) and may include other web technologies such as cascading style sheets (CSS) for styling and layout, JavaScript (JS) for interactivity and dynamic behavior, and multimedia elements such as images, videos, and audio. A browser (or more specifically a rendering engine of the browser) may interpret the codes or scripts in a web page and create a visual representation of the web page on a screen as seen by a user. Browser tabs allow users to have multiple web pages opened simultaneously within the same browser window.

In the illustrated example of FIG. 1, the browser 112 includes a parent tab 114 and a child tab 116, where the child tab 116 may be loaded or instantiated by the parent tab 114 as will be discussed more fully below with reference to FIG. 3. Generally, the parent tab 114 may load any suitable number of child tabs 116. Each of the parent tab 114 and the child tab 116 may include program codes or instructions executed by one or more processors of the computer system 110. In some examples, the program codes or instructions of the parent tab 114 and the child tab 116 may be requested from the servers 142 at runtime as will be discussed more fully below and stored at the non-transitory memory of the computer system 110 for execution by the one or more processors.

Figure 2:
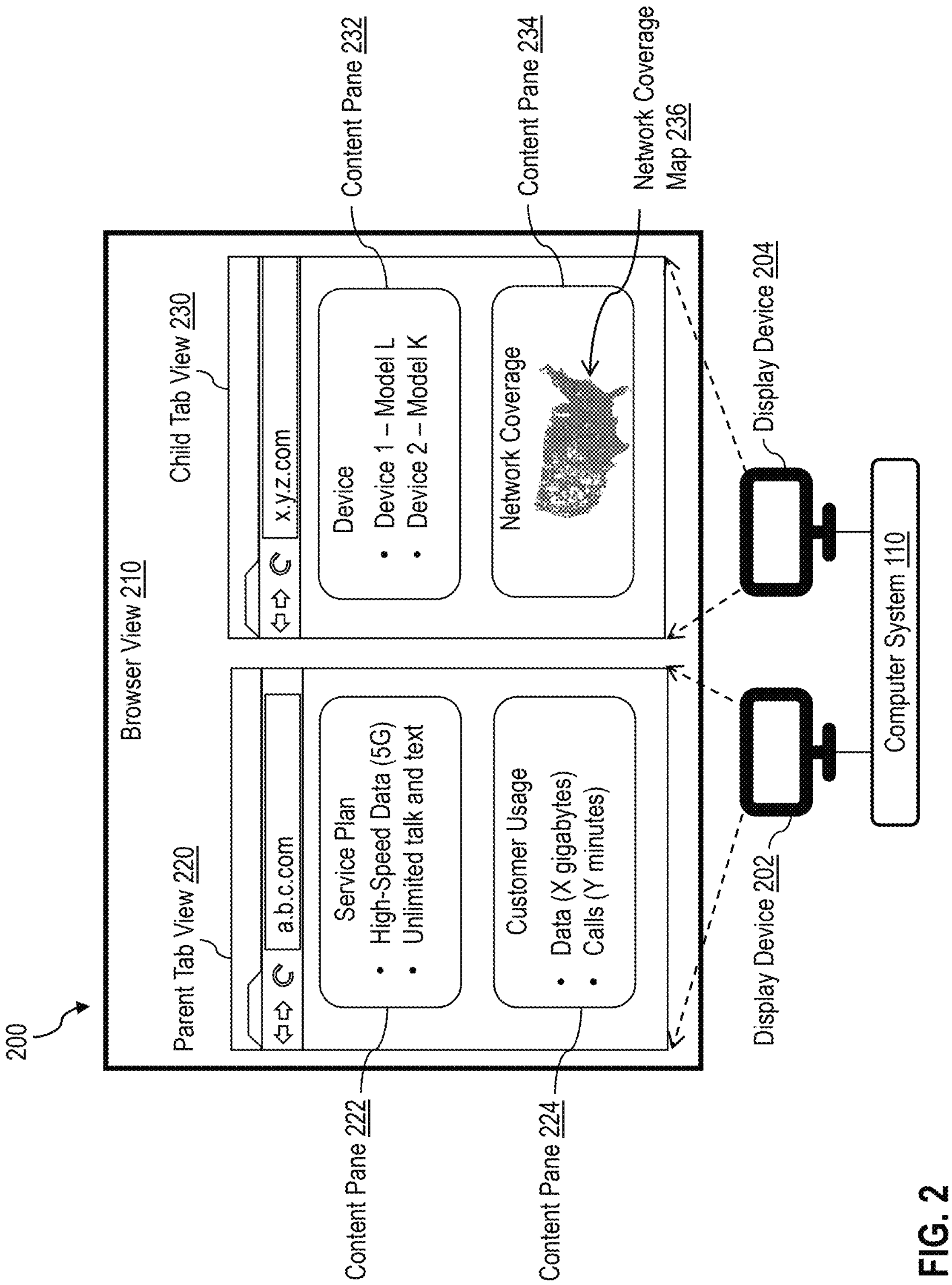
FIG. 2 is a block diagram illustrating an example user interface (UI) presentation for a browser with multiple browser tabs according to an embodiment of the disclosure.

As discussed above, browser tabs are UI or GUI within a browser, the underlying software of the parent tab 114 and the child tab 116 that provides the UI or GUI is shown in FIG. 1, and an example UI presentation of the parent tab 114 and the child tab 116 is shown in FIG. 2. As shown in FIG. 1, the parent tab 114 and the child tab 116 may include a plurality of micro-applications 120 (e.g., 2, 3, 4 or more), a common state-sharing application 122, and a state store 124. In the illustrated example of FIG. 1, the parent tab 114 may include micro-applications 120*a*, . . . , 120*b*, a common state-sharing application 122*a*, and a parent state store 124*a*, and the child tab 116 may include micro-applications 120*c*, . . . , 120*d*, a common state-sharing application 122*b*, and a child state store 124*b*. When the parent tab 114 is created and loaded (e.g., by the browser 112), a parent container 118 including the micro-applications 120*a*, . . . , 120*b*, the common state-sharing application 122*a*, and the parent state store 124*a* may be loaded within the parent tab 114. Similarly, when the child tab 116 is created and loaded by the parent tab 114, a child container 119 including the micro-applications 120*c*, . . . , 120*d*, the common state-sharing application 122*b*, and the child state store 124*b* may be loaded within the child tab 116.

Each of the micro-applications 120 may include executable computer functionality that is available as a service and exposed programmatically via web protocols (e.g., HTTP and/or HTTPS) and other protocols. The micro-applications 120 may include program codes developed using Angular, HTML, JS, CSS, and/or so forth. The micro-applications 120 may be implemented, called, executed, and updated independent of each other. The micro-applications 120 may include programming codes that generate user interface elements (e.g., buttons, checkboxes, graphics, texts, a navigation bar) and/or interface with various utilities and/or tools (e.g., related to access authorization, billing, payment, data management, customer support solutions, etc.). A micro-frontend web application may generally be a small piece of a web-based application. A micro-frontend web application may include programmatic layers to interact with backend services (e.g., application programming interfaces (APIs), network connectivity, and/or generally server-side computing functionality). A micro-frontend web application may be independently implemented, called, executed, and updated. Accordingly, a frontend implemented using the modular approach can offer flexibility and scalability. As the number and types of services, data, products, and operations increase, the number and types of frontend applications (for user interactions) may also increase. Thus, the flexibility and scalability provided by micro-frontend applications can be beneficial.

The parent state store 124*a* and the child state store 124*b* may be stored in memory (e.g., the non-transitory memory) of the computing system 110. The parent state store 124*a* and the child state store 124*b* may respectively store state information 128*a* and 128*b*. The state information 128*a* and 128*b* may be related to a specific customer account. The state information 128*a* and 128*b* may include attributes of the specific customer account. The attributes may be related to a user profile of the customer, services subscribed or cancelled by the customer, and/or products purchased by the customer. For instance, the attributes may include, but is not limited to, the customer account number, the number of phone lines under the account, the phone numbers associated with the phone lines, the subscribed mobile service plan, the devices (e.g., manufacturers and/or device model) that utilize the mobile services subscribed by the account, the customer usages (e.g., the amount of data used by the customer or the amount of time spent in calls by the customer), network coverages, and so forth. The micro-applications 120 (e.g., 120*a* and 120*b*) in the parent tab 114 may be executed based on the state information 128*a* stored in the parent state store 124*a*. For example, the micro-application 120*a* or 120*b* may read the state information 128*a* from the parent state store 124*a* and/or write state information 128*a* to the parent state store 124*a*. Similarly, the micro-applications 120 (e.g., 120*c* and 120*d*) in the child tab 116 may be executed based on the state information 128*a* stored at the child state store 124*b*. For example, the micro-application 120*c* or 120*d* may read the state information 128*b* from the child state store 124*b* and/or write state information 128*b* to the child state store 124*b*.

The common state-sharing application 122*a* and 122*b* may include software program codes and may share common codes or the same codes. The common state-sharing applications 122*a* and 122*b* may be developed using any suitable programming languages (e.g., C, C++, java, JS, HTML, etc.). as the micro-applications 120. In some examples, a common state-sharing application 122 is a micro-application 120 itself.

The parent state store 124*a* and the child state store 124*b* may be managed and maintained separately by respective common state-sharing application 122*a* and common state-sharing application 122*b*. For instance, the common state-sharing application 122*a* of the parent tab 114 may create, maintain, and/or update the state information 128*a* in the parent state store 124*a* and notify the micro-applications 120 (e.g., 120*a* and 120*b*) in the parent tab 114 of any updates in the state information 128*a* (in the parent state store 124*a*). Similarly, the common state-sharing application 122*b* of the child tab 116 may create, maintain, and/or update the state information 128*b* in the child state store 124*b* and notify the micro-applications 120 (e.g., 120*c* and 120*d*) in the child tab 116 of any updates in the state information 128*b* (in the child state store 124*b*). A change in the state information 128*a* at the parent state store 124*a* may be triggered by a user input received in the parent tab 114 or an execution of a micro-frontend web application 120 in the parent tab 114. Similarly, a change in the state information 128*b* at the child state store 124*b* may be triggered by a user input received in the child tab 116 or an execution of a micro-frontend web application 120 in the child tab 116.

To support state-sharing across the parent tab 114 and the child tab 116, the common state-sharing applications 122*a* and 122*b* may share or exchange state information changes or updates with each other. For instance, upon the common state-sharing application 122*a* detecting a change in the state information at the parent state store 124*a*, the common state-sharing application 122*a* may transmit the updated state information to the child tab 116. Similarly, upon the common state-sharing application 122*b* detecting a change in the state information at the child state store 124*b*, the common state-sharing application 122*b* may transmit the updated state information to the parent tab 114. As such, the state information 128*a* at the parent state store 124*a* and the state information 128*b* at the child state store 124*b* may be identical (or synchronized). However, in some examples, the parent state store 124*a* may include additional state information that is not in the child state store 124*b*. Mechanisms for sharing state information between micro-applications 120 across multiple browser tabs (e.g., the parent tab 114 and the child tab 116) will be discussed more fully below with reference to FIGS. 3-5.

As further shown in FIG. 1, the parent tab 114 (or the parent container 118) may further include a tab loading application 126. As discussed above, the child tab 116 may be loaded or instantiated by the parent tab 114. For instance, when the browser 112 is first executed or loaded, the browser 112 may load the parent tab 114. The tab loading application 126 may load or instantiate the child tab 116. In an example, the instantiation of the child tab 116 may be based on a user input. For instance, the customer service agent 130 may utilize the browser 112 to troubleshoot a customer's issue (e.g., a slow connection speed as discussed above). To troubleshoot the customer's issue, the customer service agent 130 may desire to view information associated with the customer's service plan, usage, device, and network coverage on the browser 112. The customer service agent 130 may initially view the customer's service plan information and usage information in the parent tab 114 and may subsequently load the child tab 116 to view the customer's device information and network coverage information. In other examples, the tab loading application 126 may load the child tab 116 autonomously based on a certain custom support rule or template (e.g., for troubleshooting a network connection issue). FIG. 2 provides an example of a UI presentation or layout for the customer's service plan, usage, device, and network coverage information in the browser 112.

The servers 142 may include micro-application servers, web servers, and/or API servers. The servers 142 may support server-side scripting via multiple scripting languages, such as Active Server Pages (ASP), Hypertext Preprocessor (PHP), Angular, React, Vue and other server-side or client-side scripting frameworks. The servers 142 may access multiple data stores 144 via the network 140. The multiple data stores 144 may include code data stores (e.g., that store the micro-application 120 codes), content stores (e.g., that store web pages related to CRM).

A micro-application server 142 may communicate with the browser 112 to deliver micro-applications 120 (e.g., software codes). For instance, during runtime, the browser 112 may send a request to access a micro-application 120 to the micro-application server 142. In response, the micro-application server 142 may locate the micro-application 120 (e.g., from a data store 144) and send the micro-application 120 to the browser 112. In an example, a micro-application framework may be implemented in the network system 100 to manage a list of micro-applications 120. The micro-application list may include a repository of all micro-applications 120 as well as a dictionary of associated permissions and controls for access. The micro-applications 120 may be identified by unique identifiers that are known by the micro-application framework, such as titles or network addresses (e.g., a uniform resource identifier (URI), a URL, an Internet protocol (IP) address, etc.). In some embodiments, each micro-application 120 may have an individual micro-application application server 142. The request to retrieve a micro-application 120 can be made using a micro-application domain name server (DNS) and routed to the appropriate server 142 using DNS resolution and/or routing rules.

A web server 142 may communicate with the browser 112 to deliver web content. The browser 112 may interact with the web server 142 to request and receive the web content (e.g., information related to billings, payments, service plans, customer usages, customer devices, and/or network coverage) using substantially similar mechanisms as interaction with the micro-application server 142. For instance, the micro-applications 120 may interact with web content hosted on the web server 142.

An API server 142 may communicate with the browser 112 to deliver API functions (e.g., utilities related to billings, payments, service plans, customer usages, customer devices, and/or network coverage). The browser 112 may interact with the API server 142 to request and receive the API functions using substantially similar mechanisms as interaction with the micro-application server 142. For instance, the micro-applications 120 may interact with APIs hosted on the API server 142. Generally, the hosting of the micro-applications 120 codes, the web content, and the APIs may be arranged in any suitable way and on any one or more of the servers 142.

Turning now to FIG. 2, an example UI presentation 200 for the browser 112 is described. The UI presentation 200 may include a browser view 210 (e.g., a window) generated by the browser 112. For instance, the browser 112 may include a rendering engine to interpret and/or execute codes or scripts in a web page and create a visual representation of the web page on a screen as seen by a user.

As shown in FIG. 2, the browser view 210 may include a parent tab view 220 and a child tab view 230. The parent tab view 220 may include content panes 222 and 224. The content pane 222 illustrates a service plan subscribed by a particular customer. For instance, the service plan includes a high-speed data plan with 5G access and unlimited talk and text. The content pane 224 illustrates a usage of the customer. For instance, the customer had utilized X gigabytes of data (e.g., upload and/or download) and Y minutes in calls. The parent tab view 220 may correspond to the parent tab 114, the content pane 222 may be generated by a micro-application 120 (e.g., the micro-application 120*a*) of the parent tab 114, and the content pane 224 may be generated by another micro-application 120 (e.g., the micro-application 120*b*) of the parent tab 114.

The child tab view 230 may include content panes 232 and 234. The content pane 232 illustrates devices of the customer. For instance, the customer may have two devices, where one device is of a model L (e.g., an Apple device "iPhone 13") and another device is of a model M (e.g., an Apple device "iPhone 12"). The content pane 234 illustrates a network coverage provided by the mobile service provider. For instance, the content pane 234 may illustrate a network coverage map 236 (e.g., illustrating network coverages in United States). The child tab view 230 may be correspond to the child tab 116, the content pane 222 may be generated by a micro-application 120 (e.g., the micro-application 120*c*) of the child tab 116, the content pane 224 may be generated by another micro-application 120 (e.g., the micro-application 120*d*) of the child tab 116.

In an example, the parent tab view 220 may display content loaded from one URL (e.g., "a.b.c.com"), and the child tab view 230 may display content loaded from another URL (e.g., "x.y.z.com"). Each of the micro-applications 120*a*, 120*b*, 120*c*, and 120*d* may be a single web application displaying content from a respective URL. For instance, the URL "a.b.c.com" (for the parent tab 114) may be a root URL, and the micro-application 120*a* (for the service plan) and micro-application 120*b* (for the customer usage) may each load content from a respective URL under the root URL "a.b.c.com" and the content may be integrated at runtime to present or function as a single web page. Similarly, the URL "x.y.z.com" (for the child tab 116) may be a root URL, and the micro-applications 120*c* (for the device) and 120*d* (for the network coverage) may each load content from a respective URL under the root URL "x.y.z.com" and the content may be integrated at runtime to present or function as a single web page.

As shown in FIG. 2, the parent tab view 220 and the child tab view 230 are provided to a user at the same time (e.g., simultaneously). In the illustrated example of FIG. 2, the parent tab view 220 is displayed on one displaying device 202 (e.g., a monitor) of the computer system 110 while the child tab view 230 is displayed on another displaying device 204 (e.g., a monitor) of the computer system 110. In other examples, the parent tab view 220 and the child tab view 230 may be displayed on the same displaying device of the computer system 110.

Figure 3:
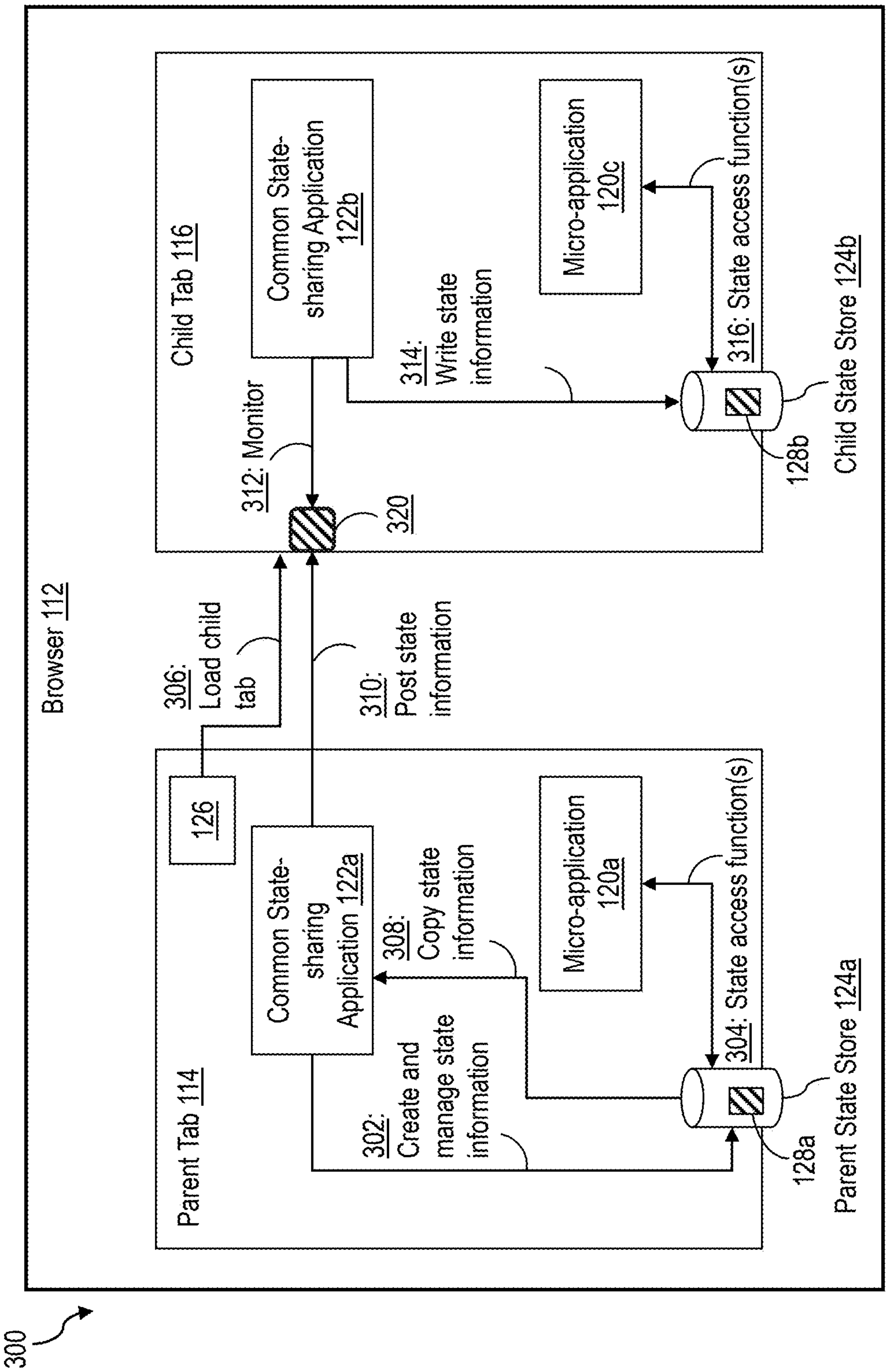
FIG. 3 is a block illustrating an example method of loading a child tab from a parent tab within a browser according to an embodiment of the disclosure.
Figure 4:
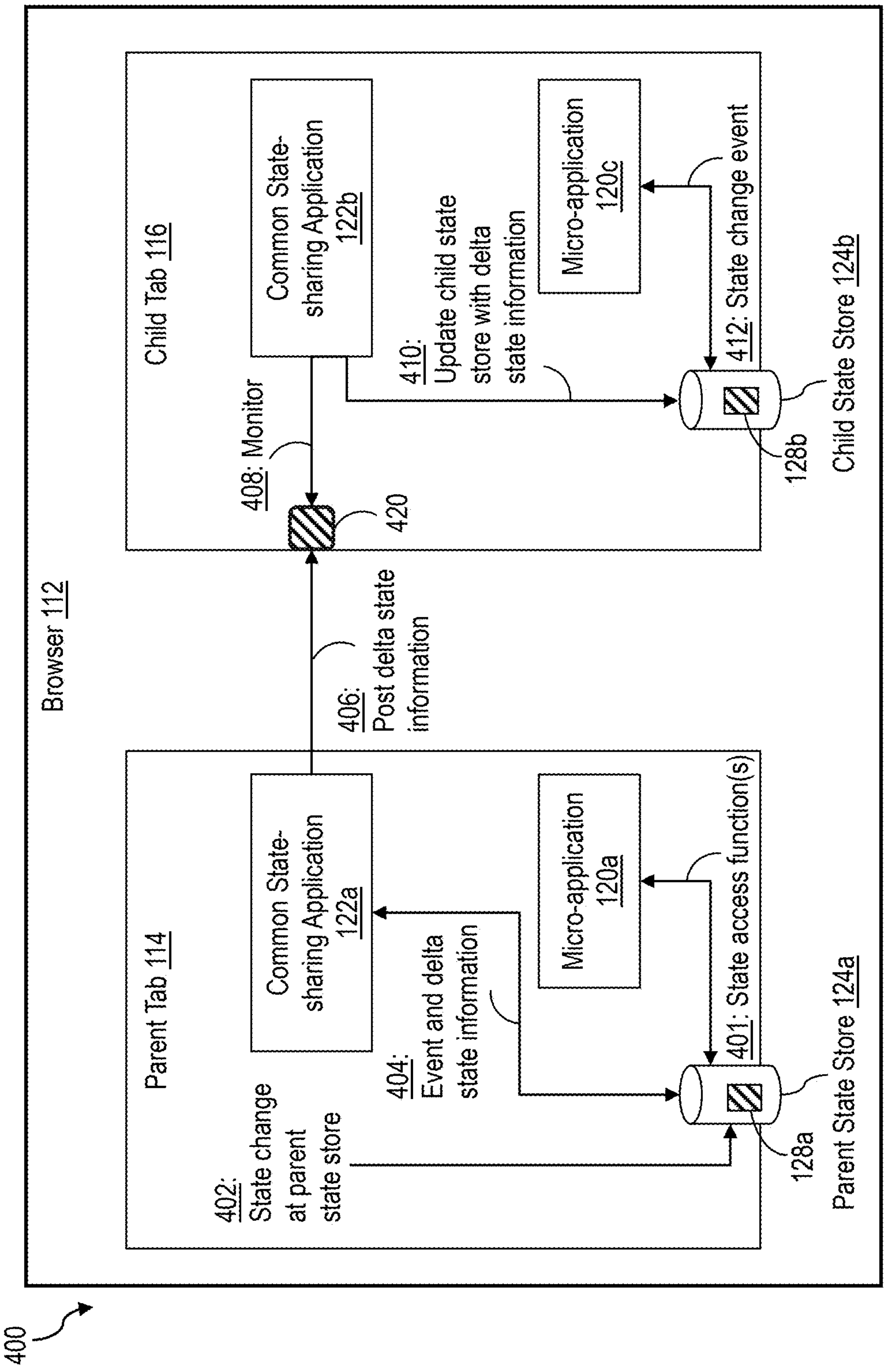
FIG. 4 is a block illustrating an example method of sharing states between micro-frontend web applications across multiple browser tabs according to an embodiment of the disclosure.
Figure 5:
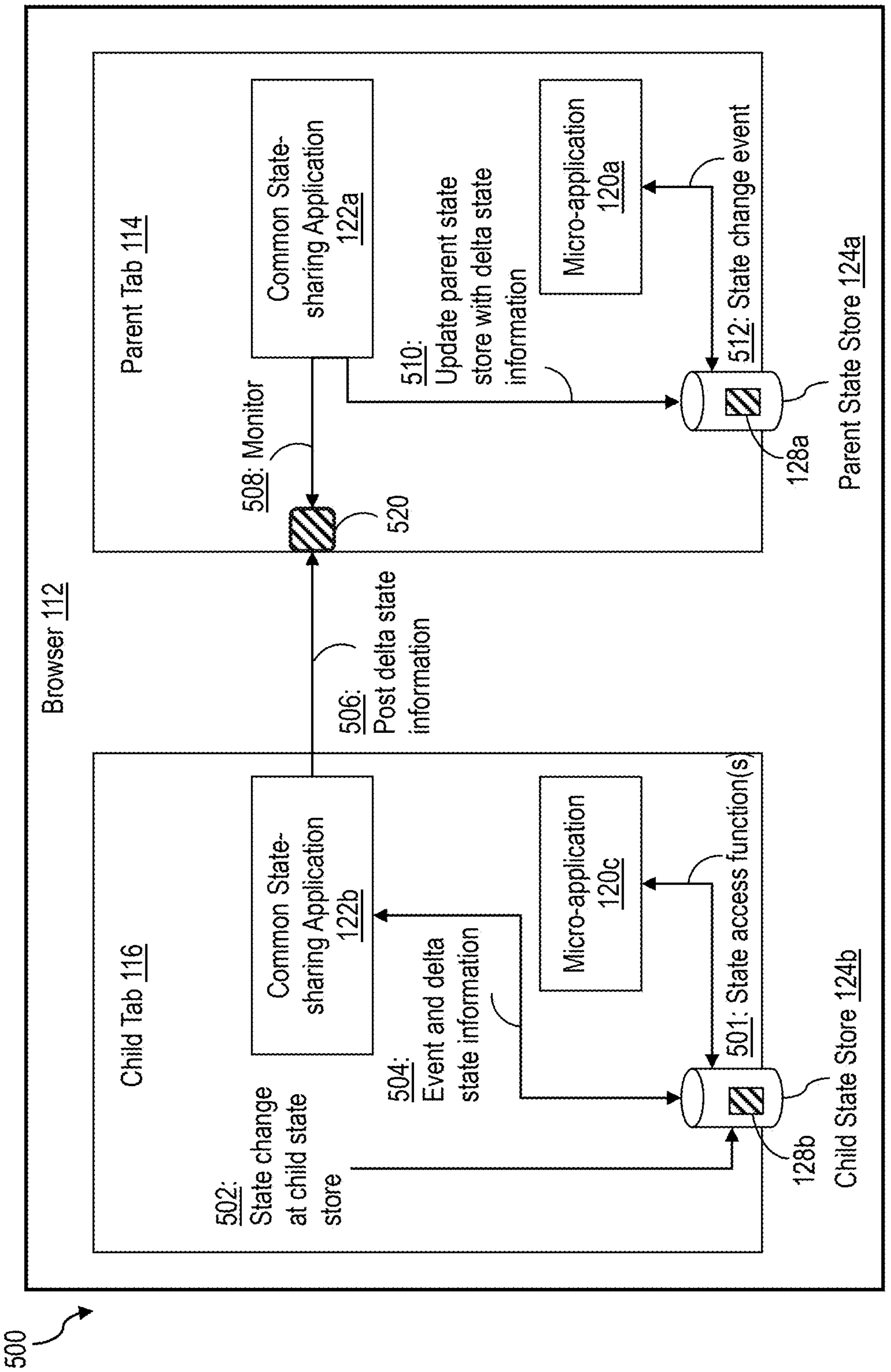
FIG. 5 is a block illustrating another example method of sharing states between micro-frontend web applications across multiple browser tabs according to an embodiment of the disclosure.

FIGS. 3-5 illustrate various mechanisms for sharing state information across multiple browser tabs (e.g., the parent tab 114 and the child tab 116). FIGS. 3-5 are discussed in connection with FIGS. 1-2. For ease of illustration, the parent container 118 and the child container 119 are not shown in FIGS. 3-5. Additionally, a single micro-application 120*a* is shown in the parent tab 114 and a single micro-application 120*c* is shown in the child tab 116. However, similar mechanisms can be applied to any suitable number of micro-applications 120 in each of the parent tab 114 and child tab 116.

Turning now to FIG. 3, an example method 300 of loading a child tab 116 from a parent tab 114 within a browser 112 is described. At operation 302, the parent tab's 114 common state-sharing application 122*a* may create and manage state information 128*a* in the parent state store 124*a*. At operation 304, the micro-application 120*a* in the parent tab 114 may be executed based on the state information 128*a* in the parent state store 124*a*. For instance, the micro-application 120*a* may read the state information 128*a* from the parent state store 124*a* and/or write the state information 128*a* to the parent state store 124*a* via state access functions (e.g., APIs).

At operation 306, the tab loading application 126 may load a child tab 116, for example, triggered by a user input received at the parent tab 114 or based on a certain rule or template. At operation 308, in response to the loading of the child tab 116, the parent tab 114's common state-sharing application 122*a* may copy the state information 128*a* from the parent state store 124*a*. At operation 310, the parent tab 114's common state-sharing application 122*a* may transmit or post the state information 128*a* (copied from the parent state store 124*a*) to the child tab 116 (e.g., in a message 320). In an example, the common state-sharing application 122*a* may create a state object including all of the state information 128*a* and post the state object to the child tab 116. In an example, the common state-sharing application 122*a* may serialize the state information 128*a* when posting the state information 128*a* to the child tab 116. For instance, the state information 128*a* may be arranged in a certain data structure in the parent state store 124*a*, and the common state-sharing application 122*a* may transmit the state information 128*a* as a stream of data bytes. In general, the common state-sharing application 122*a* may organize or arrange the state information 128*a* in any suitable way when posting the state information 128*a* to the child tab 116.

At operation 312, after the child tab 116 is loaded, the child tab 116's common state-sharing application 122*b* may monitor for message(s) 320 from the parent tab 114. Based on the monitoring, the child tab 116's common state-sharing application 122*b* may receive the state information 128*a* from the parent tab 114.

At operation 314, upon receiving the state information 128*a*, the child tab 116's common state-sharing application 122*b* may write (or store) the state information 128*a* in the child state store 124*b* (shown by the state information 128*b*). At this point of time, the state information 128*b* at the child state store 124*b* may be identical to the state information 128*a* at the parent state store 124*a*. In some cases, not all of the state information 128*a* at the parent state store 124*a* may be relevant to the child tab 116, and thus the parent tab 114's common state-sharing application 122*a* may post only a relevant portion of the state information 128*a* to the child tab 116. In such cases, the state information 128*b* may be a subset of the state information 128*a*.

At operation 316, the micro-application 120*c* in the child tab 116 may be executed based on the state information 128*b* at the child state store 124*b*. For instance, the micro-application 120*c* may read the state information 128*b* from the child state store 124*b* and/or write the state information 128*b* to the child state store 124*b* via state access functions (e.g., APIs).

Turning now to FIG. 4, an example method 400 of sharing states between micro-frontend web applications (e.g., the micro-applications 120) across multiple browser tabs (e.g., the parent tab 114 and the child tab 116) is described. The method 400 may be implemented after the method 300. The method 400 may be implemented when there is a change in the state information 128*a* at the parent state store 124*a*. At operation 401, the parent tab 114's micro-application 120*a* may continue to be executed based on the state information 128*a* at the parent state store 124*a*.

At operation 402, a state change (e.g., a change in the state information 128*a*) occurs at the parent state store 124*a*. The change in the state information 128*a* can be triggered by a user input or based on the execution of the micro-application 120*a*. For instance, the micro-application 120*a* may update or change a piece of the state information 128*a*. At operation 404, based on the state change at the parent state store 124*a*, an event may be posted to the parent tab 114's common state-sharing application 122*a*, and the parent tab 114's common state-sharing application 122*a* may fetch the updated state information 128*a* (e.g., delta state information) from the parent state store 124*a*. At operation 406, the parent tab 114's common state-sharing application 122*a* may post the delta state information (the portion of the state information 128*a* that has changed) to the child tab 116 (e.g., in a message 420).

At operation 408, the child tab 116's common state-sharing application 122*b* may monitor for message(s) 420 from the parent tab 114. Based on the monitoring, the child tab 116's common state-sharing application 122*b* may receive the delta state information from the parent tab 114. At operation 410, the child tab 116's common state-sharing application 122*b* may update the child state store 124*b* with the received delta state information. As such, the child state store 124*b* may include updated state information 128*b*. At operation 412, after the child state store 124*b* is updated, a state change event may be posted to the child tab 116's micro-application 120*c*. Subsequently, the micro-application 120*c* may be executed based on the updated state information 128*b* at the child state store 124*b*. In an example, if the child tab 116 includes multiple micro-applications 120, the common state-sharing application 122*b* may post a state change event to each of the micro-applications. That is, the common state-sharing application 122*b* may also handle state sharing among micro-applications 120 within the child tab 116.

Turning now to FIG. 5, an example method 500 of sharing states between micro-frontend web applications (e.g., the micro-applications 120) across multiple browser tabs (e.g., the parent tab 114 and the child tab 116) is described. The method 500 may be implemented after the method 300. The method 500 may be implemented when there is a change in the state information 128*b* at the child state store 124*b*. The method 500 may utilize similar mechanisms as the method 400 for updating and sharing state information. At operation 501, the child tab 116's micro-application 120*b* may continue to be executed based on the state information 128*b* at the child state store 124*b*.

At operation 502, a state change (e.g., a change in the state information 128*b*) occurs at the child state store 124*b*. The change in the state information 128*b* can be triggered by a user input or based on the execution of the micro-application 120*c*. For instance, the micro-application 120*c* may update or change a piece of the state information 128*b*. At operation 504, based on the state change at the child state store 124*b*, an event may be posted to the child tab 116's common state-sharing application 122*b*, and the child tab 116's common state-sharing application 122*b* may fetch the updated state information 128*b* (e.g., delta state information) from the child state store 124*b*. At operation 506, the child tab 116's common state-sharing application 122*b* may post the delta state information to the parent tab 114 (e.g., in a message 520).

At operation 508, the parent tab 114's common state-sharing application 122*b* may monitor for message(s) 520 from the child tab 116. Based on the monitoring, the parent tab 114's common state-sharing application 122*a* may receive the delta state information from the child tab 116. At operation 510, the parent tab 114's common state-sharing application 122*a* may update the parent state store 124*a* with the received delta state information. That is, the parent state store 124*a* may include updated state information 128*a* based on the update. At operation 512, after the parent state store 124*a* is updated, a state change event may be posted to the parent tab 114's micro-application 120*a*. Subsequently, the micro-application 120*a* may be executed based on the updated state information 128*a* at the parent state store 124*a*. In an example, if the parent tab 114 includes multiple micro-applications 120, the common state-sharing application 122*a* may post a state change event to each of the micro-applications 120. That is, the common state-sharing application 122*a* may also handle state sharing among micro-applications 120 within the parent tab 114.

Figure 6:
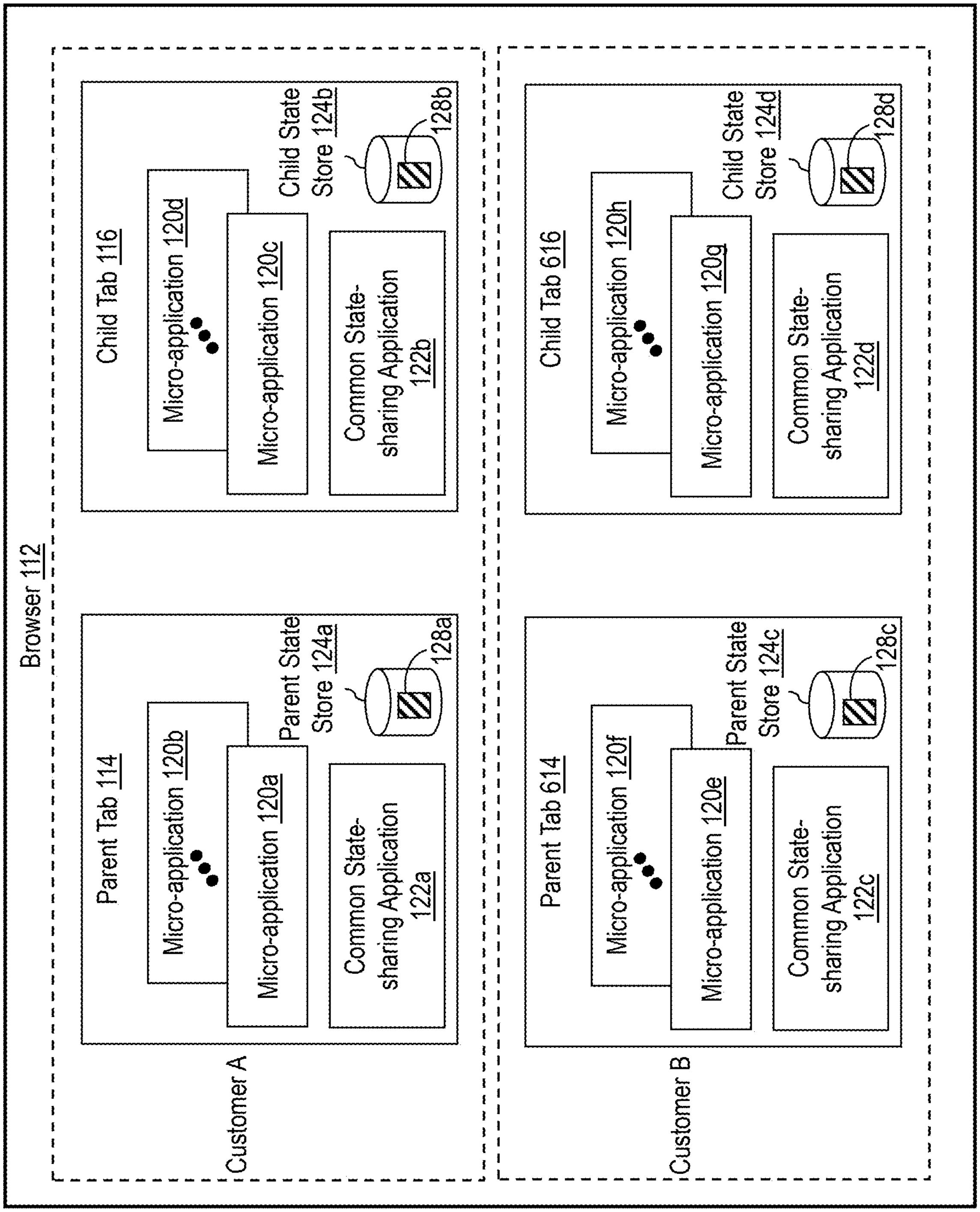
FIG. 6 is a block illustrating an example use case scenario for supporting multiple customers using multiple browser tabs in a single browser according to an embodiment of the disclosure.

Turning now to FIG. 6, an example uses case scenario 600 is described. In the use case scenario 600, the customer service agent 130 may open multiple browser tabs in a single browser when servicing multiple customers (e.g., customer A and customer B) at the same time. For instance, the customer service agent 130 may utilize the parent tab 114 and the child tab 116 as discussed above to service customer A.

As shown in FIG. 6, the customer service agent 130 may further load a parent tab 614 and the child tab 616 in the browser 112 to service customer B. The parent tab 614 and the child tab 616 may be substantially similar to the parent tab 114 and the child tab 116, respectively. For instance, the parent tab 614 may include a plurality of micro-applications 120 (shown as 120*e*, . . . , 120*f*), a common state-sharing application 122*c*, a parent state store 124*c*, and a tab loading application 126*c*. The tab loading application 126*c* of the parent tab 614 may load the child tab 616 using similar mechanisms as discussed above with reference to FIG. 3. The child tab 616 may include a plurality of micro-applications 120 (shown as 120*g*, . . . , 120*h*), a common state-sharing application 122*d*, a child state store 124*d*. The parent tab 614 may share state information 128*c* at the parent state store 124*c* with the child tab 616, and the child tab 616 may share state information 128*d* at the child state store 124*d* with the parent tab 614 using similar mechanisms as discussed above with reference to FIGS. 4-5.

The customer service agent 130 may switch back and forth among the parent tab 114, the child tab 116, the parent tab 614, and the child tab 616 to service customers A and B. The micro-applications 120 in each of the parent tabs 114 and 614 and the child tabs 116 and 616 may be executed independent of each other. State information sharing may occur between each set of parent-child tabs but not across the different sets of parent-child tabs. For instance, the parent tab 114 and corresponding child tab 116 may share state information with each other, the parent tab 614 and corresponding child tab 616 may share state information with each other. In an example, operations of the parent tab 114 and the child tab 116 may be executed within a first execution environment, and operations of the parent tab 114 and the child tab 116 may be executed within a second execution environment isolated from the first execution environment.

Figure 7:
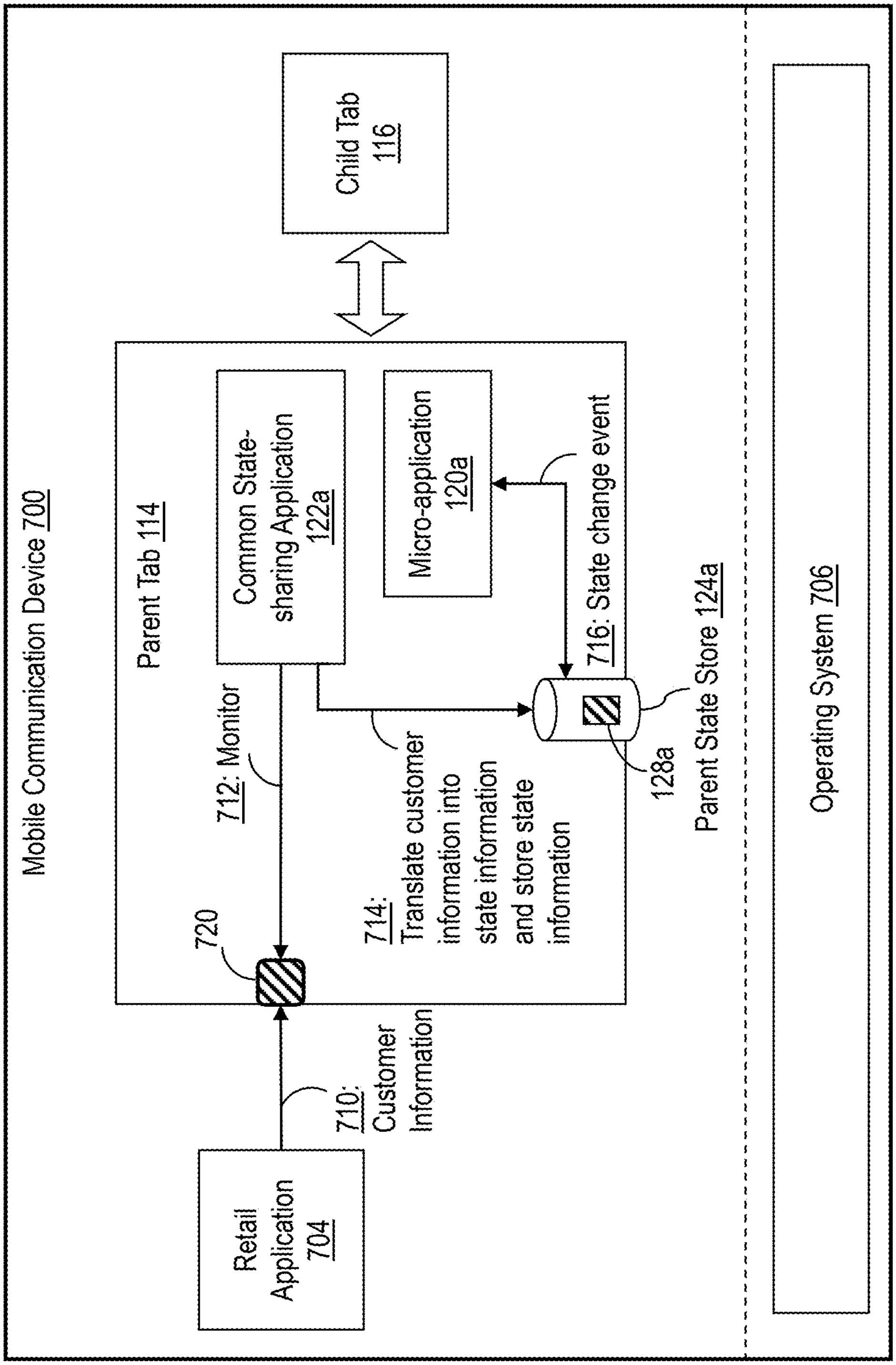
FIG. 7 is a block illustrating an example mobile communication device according to an embodiment of the disclosure.

Turning now to FIG. 7, an example mobile communication device 700 is described. The mobile communication device 700 may be part of a retail service system. For instance, a sales representative at a retail store may utilize the mobile communication device 700 to service customers. The retail service system may be substantially similar to the network system 100 of FIG. 1, where the mobile communication device 700 may communicate with the servers 142 and data stores 144 via the network 140 to access codes, APIs, and/or web contents related to CRM operations.

The mobile communication device 700 may be a smartphone, a tablet, or any wirelessly equipped communication device. The mobile communication device 700 may include at least one non-transitory memory and one or more processor(s). The mobile communication device 700 may include a retail application 704 including program codes or instructions stored in the non-transitory memory of the computer system 110 and executed by the one or more processor(s) of the computer system 110 to perform CRM frontend operations discussed herein. The retail application 704 is a non-browser application that executes on top of an operating system 706 of the mobile communication device 700. The retail application 704 may be implemented as a native OS application (e.g., developed specifically for operations with the OS 706).

A native application or native OS application is a software program specifically written to run on the underlying OS of a computer system or device. For instance, the native application may have access to (i.e., can invoke) native OS application programming interfaces (APIs) that are implemented by the underlying OS. The APIs may provide interface to hardware component of the computer system or device and/or network connectivity. A user may interact directly with a UI provided by the native application instead of a browser. To provide a user with access to web content, the native application can include an embedded browser to access the web content, and the UI of the native application may communicate with the embedded browser. As an example, the mobile communication device 700 may be an Apple iPad® tablet, the OS 706 may be an iOS, and the retail application 704 may be an application developed specifically to operate on the iOS.

The retail application 704 may leverage or reuse the CRM frontend implementations discussed above with reference to FIGS. 1-6. For instance, the retail application 704 may include an embedded, integrated, or plug-in browser engine performing operations similar to the browser 112 (e.g., rendering the micro-applications 120 in the parent tab 114 and the child tab 116). The retail application 704 may lookup account information of a customer and/or verify the customer by opening browser tabs (e.g., the parent tab 114 and the child tab 116) internally. As an example, at operation 710, the retail application 704 may load the parent tab 114, and may transmit the customer information (e.g., in a message 720) to the parent tab 114. At operation 712, the parent tab 114's common state-sharing application 122*a* may monitor for incoming messages and may receive the message 720.

At operation 714, the parent tab 114's common state-sharing application 122*a* may translate the received customer information into state formation 128*a*, create the parent state store 124*a*, and store the translated state information 128*a* into the parent state store 124*a*. The translation of the customer information into the state information 128*a* may be based on certain rules (e.g., business logic). As an example, the CRM system may verify a customer identity via a billing account number (BAN), an active mobile station international subscriber directory number (MSISDN), a personal identification number (PIN) code), and a primary account holder name, whereas the retail service system may verify a customer identity based on a BAN, a working MSISDN, and a customer trust score (e.g., based on a photo identification of a customer such as a driver license and/or a passport of the customer). The rules may specify a range of customer trust scores (e.g., 1, 2, 3, . . . , etc.), where each customer trust score may correspond to a certain type of verifications or authorization. For instance, a customer trust score of 3 may correspond to a verification of a PIN and a primary account holder name. Thus, upon the common state-sharing application 122*a* receiving the customer information including the BAN, the MSISDN, and the customer trust score 3, the common state-sharing application 122*a* may generate a state object (e.g., the state information 128*a*) indicating a verified or authorized customer with the customer's BAN and MSISDN.

At operation 716, the parent state store 124*a* may transmit a state change event to the micro-application 120*a* based on the state information generated (or translated) by the parent tab 114's common state-sharing application 122*a*. The micro-application 120*a* may be executed based on the state information 128*a* in the parent state store 124*a*.

Subsequently, upon the parent tab 114's common state-sharing application 122*a* receiving an incoming message 720 (the customer information), the common state-sharing application 122*a* may check if the message 720 is received from the retail application 704. If so, the common state-sharing application 122*a* may translate the message 720 (the customer information) into state information that is compatible with operations of the micro-applications 120.

The retail application 704 may also load a child tab 116 using similar mechanisms as discussed above with reference to FIG. 3. The child tab 116 may be as shown in FIGS. 1 and 3-6. For ease of illustration, details of the child tab 116 are not illustrated in FIG. 7. The parent tab 114 and the child tab 116 may perform operations (e.g., executions of micro-applications 120 and common state-sharing applications 122, and exchange state information 128 with each other) using similar mechanisms as discussed above with reference to FIGS. 4-6. Further, the retail application 704 may include a UI to present web content provided by the parent tab 114 and the child tab 116. The UI may arrange and present the web content in any suitable way.

Figure 8:
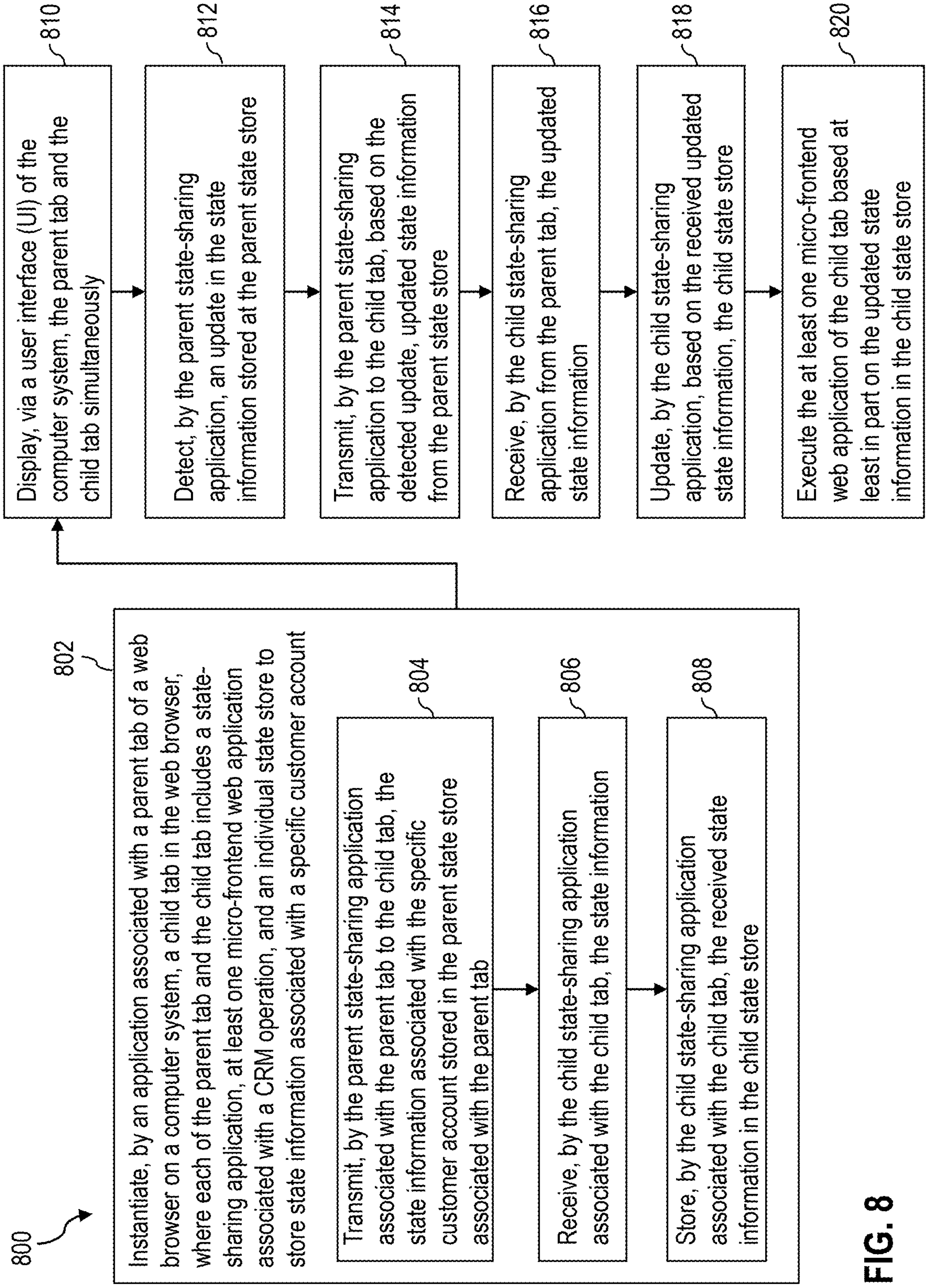
FIG. 8 is a flow chart of a method according to an embodiment of the disclosure.
Figure 10:
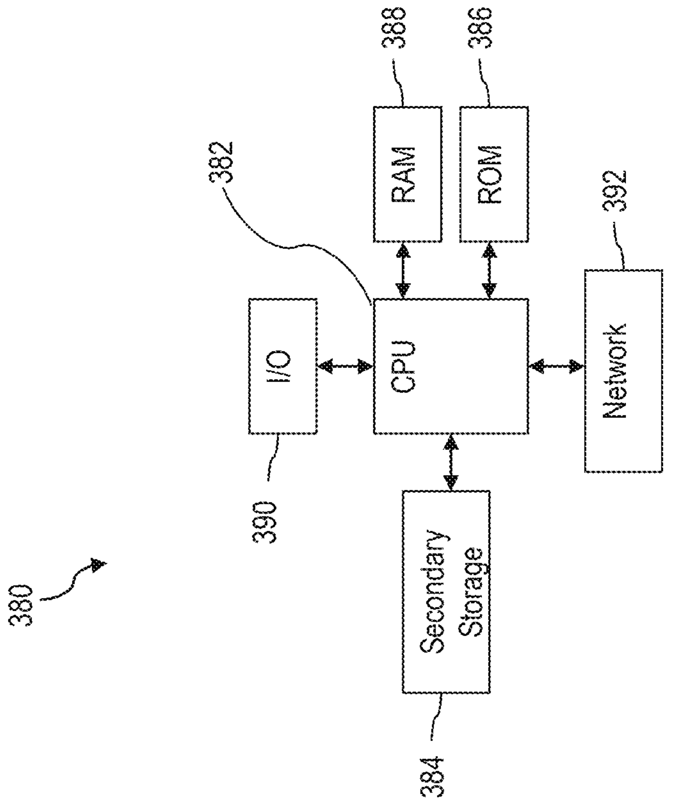
FIG. 10 is a block diagram of a computer system according to an embodiment of the disclosure.

Turning now to FIG. 8, a method 800 is described. In an embodiment, the method 800 is a method of sharing state information between micro-frontend web applications 120 across multiple browser tabs (e.g., the parent tab 114 and the child tab 116) of a single web browser 112 in a CRM system (e.g., the network system 100). The method 800 may include similar mechanisms as discussed above with reference to FIGS. 1-6. In embodiments, the method 800 may be implemented using a computer system with components as shown in FIG. 10. As illustrated, FIG. 8 includes a number of enumerated operations, but embodiments of the operations in FIG. 8 may include additional operations before, after, and in between the enumerated operations. In some embodiments, one or more of the enumerated operations may be omitted or performed in a different order.

At block 802, an application 126 associated with a parent tab 114 of a web browser 112 on a computer system 110 instantiates a child tab 116 in the web browser 112. Each of the parent tab 114 and the child tab 116 includes a state-sharing application 122, at least one micro-frontend web application 120 that implements a CRM operation, and an individual state store 124 for storage of state information associated with a specific customer account. In an embodiment, the CRM operation is associated with at least one of a billing, a payment, a product shipment, a service fulfillment, or a customer support associated with the specific customer account. In an embodiment, the instantiating the child tab 116 is in response to a user input.

The instantiation of the child tab 116 at block 802 may include operations at blocks 804, 806, and 808. For instance, at block 804, the parent tab state-sharing application 122*a* associated with the parent tab 114 transmits, to the child tab 116, the state information 128*a* associated with the specific customer account stored in the parent state store 124*a* associated with the parent tab 114. At block 806, the child state-sharing application 122*b* associated with the child tab 116 receives, the state information 128*a*. At block 808, the child state-sharing application 122*b* stores the received state information 128*a* in the child state store 124*b* associated with the child tab 116 (e.g., as state information 128*b*).

At block 810, a UI (e.g., the displaying devices 202 and/or 204) of the computer system 110 displays the parent tab 114 and the child tab 116 simultaneously within the web browser 112. Each of the parent tab 114 and the child tab 116 includes one or more interactive areas (e.g., the content panes 222, 224, 232, and 234) associated with the at least one micro-frontend web applications 120 of the respective tab 114 or 116. In an embodiment, the displaying includes displaying the parent tab 114 on a first display device 202 of the computer system 110 while displaying the child tab 116 on a second display device 204 of the computer system 110 different than the first display device 202.

At block 812, the parent state-sharing application 122*a* detects an update in the state information 128*a* at the parent state store 124*a*. In an embodiment, the state information 128*a* stored in the parent state store 124*a* includes an attribute (e.g., a number of phone lines or a particular phone line) of the specific customer account, and the detecting the update in the state information 128*a* at the parent tab's state store at block 812 is associated with an update to the attribute (e.g., an increase in the number of phone lines or another particular phone line) of the specific customer account. At block 814, in response to the detected update, the parent tab state-sharing application 122*a* transmits, to the child tab 116, updated state information 128*a* from the parent state store 124*a*. At block 816, the child state-sharing application 122*b* receives, from the parent tab 116, the updated state information 128*a*. At block 818, the child state-sharing application 122*b* updates the child state store 124*b* based on the received updated state information 128*a* (e.g., by storing the updated state information 128*a* in the child state store 124*b* as state information 128*b*). At block 820, the at least one micro-frontend web applications 120 of the child tab 116 is executed (e.g., by a rendering engine of the browser 112) based at least in part on the updated state information 128*b* in the child state store 124*b*.

In an embodiment, the child tab 116 may also share state information update with the parent tab 114. For instance, the child state-sharing application 122*b* detects a second update in the state information 128*b* at the child state store 124*b*. In response to the detected second update at the child state store 124*b*, the child state-sharing application 122*b* transmits, to the parent tab 114, second updated state information 128*b* from the child state store 124*b*. The parent tab state-sharing application 122*a* receives, from the child tab 116, the second updated state information 128*b*. The parent tab state-sharing application 122*a* updates the parent state store 124*a* based on the received second updated state information 128*b* (e.g., by storing the updated state information 128*b* in the parent state store 124*a* as state information 128*a*). Subsequently, the at least one micro-frontend web applications 120 of the parent tab 114 is executed (e.g., by a rendering engine of the browser 112) based at least in part on the second updated state information 128*a* in the parent state store 124*a*.

In an embodiment, each of the parent tab 114 and the child tab 116 includes a plurality of micro-frontend web applications 120, and each of the plurality of micro-frontend web applications 120 of the parent tab 114 and the child tab 116 corresponds to a different web page hosted on one or more servers 142 of the CRM system.

Figure 9:
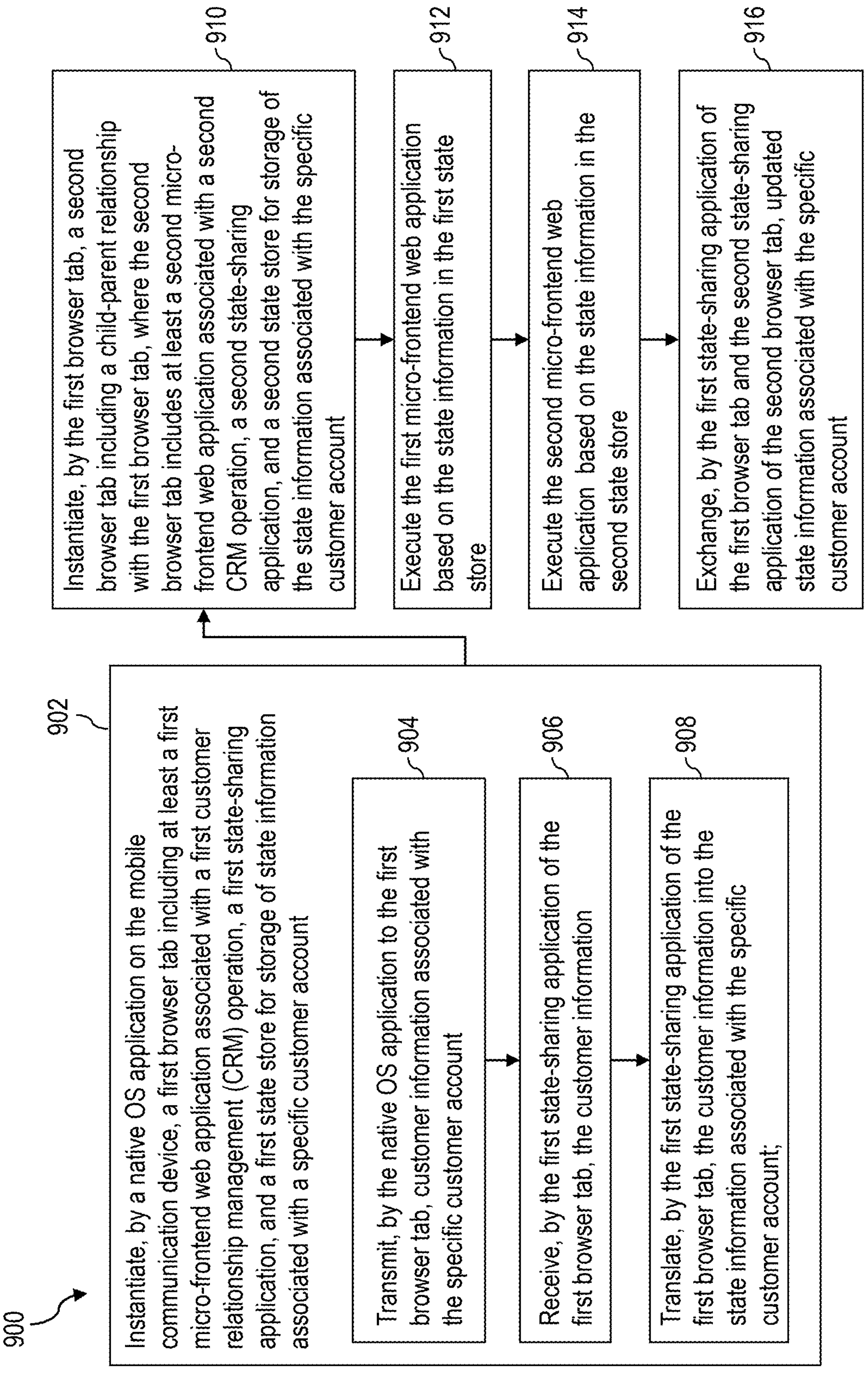
FIG. 9 is a flow chart of another method according to an embodiment of the disclosure.

Turning now to FIG. 9, a method 900 is described. In an embodiment, the method 800 is a method of sharing state information between micro-frontend web applications 120 across multiple browser tabs (e.g., the parent tab 114 and the child tab 116) in a retail service system. The method 900 may include similar mechanisms as discussed above with reference to FIGS. 1-8. In embodiments, the method 900 may be implemented using a computer system with components as shown in FIG. 10. As illustrated, FIG. 9 includes a number of enumerated operations, but embodiments of the operations in FIG. 9 may include additional operations before, after, and in between the enumerated operations. In some embodiments, one or more of the enumerated operations may be omitted or performed in a different order.

At block 902, a native OS application (e.g., the retail application 704) on a mobile communication device 700 loads a first browser tab (e.g., a parent tab 114) including at least a first micro-frontend web application 120*a* associated with a first CRM operation, a first state-sharing application 122*a*, and a first state store 124*a* for storage of state information 128*a* associated with a specific customer account. The loading may include operations at blocks 904, 906, and 908. For instance, at block 904, the native OS application transmits, to the first browser tab, customer information associated with the specific customer account. At block 906, the first state-sharing application 122*a* of the first browser tab receives the customer information. At block 908, the first state-sharing application 122*a* of the first browser tab translates (or maps) the customer information into the state information 128*a* associated with the specific customer account. In an embodiment, the customer information translated into the state information 128*a* is associated with the specific customer account is associated with a customer verification. In an embodiment, the customer information is translated into the state information 128*a* associated with the specific customer account based on a mapping rule (e.g., business logic).

At block 910, the first browser tab loads a second browser tab (e.g., the child tab 116) having a child-parent relationship with the first browser tab. The second browser tab includes at least a second micro-frontend web application 120*c* associated with a second CRM operation, a second state-sharing application 122*b*, and a second state store 124*b* for storage of the state information 128*b* associated with the specific customer account. In an embodiment, the first state-sharing application 122*a* of the first browser tab and the second state-sharing application 122*b* of the second browser tab includes common codes.

At block 912, the first micro-frontend web application is executed based on the state information 128*a* in the first state store 124*a*. At block 912, the second micro-frontend web application 120*b* is executed based on the state information 128*b* in the second state store 124*b*. At block 914, the first state-sharing application 122*a* of the first browser tab and the second state-sharing application 122*b* of the second browser tab exchanges updated state information 128*b* associated with the specific customer account.

In an embodiment, the exchanging the updated state information associated with the specific customer account at block 916 includes the first state-sharing application 122*a* of the first browser tab transmitting, to the second browser tab, the updated state information 128*a* associated with the specific customer account stored in the first state store 124*a* of the first browser tab, and the second state-sharing application 122*b* of the second browser tab 116 receiving the updated state information 128*a* (e.g., the message 520). Based on the received updated state information 128*a*, the second state-sharing application 122*b* of the second browser tab updates the second state store 124*b* of the second browser tab (e.g., by storing the updated state information 128*a* in the second state store 124*b* as state information 128*b*). Based on the update at the second state store 124*b*, the second state-sharing application 122*b* of the second browser tab posts, to the second micro-frontend web application 120*c* of the second browser tab, an event indicating an update at the second state store 124*b*. Subsequently, the second micro-frontend web application 120*c* is executed based on the updated state information 128*b* in the second state store 124*b*.

In an embodiment, the exchanging the updated state information associated with the specific customer account includes the second state-sharing application 122*b* of the second browser tab transmitting, to the first browser tab, the updated state information 128*b* associated with the specific customer account stored at the second state store 124*b* of the second browser tab, and the first state-sharing application 122*a* of the first browser tab receiving the updated state information 128*b*. Based on the received updated state information 128*b*, the first state-sharing application 122*a* of the first browser tab updates the first state store 124*a* of the first browser tab (e.g., by storing the updated state information 128*b* in the first state store 124*a* as state information 128*a*). Based on the update at the first state store 124*a*, the first state-sharing application 122*a* of the first browser tab posts, to the first micro-frontend web application 120*a* of the first browser tab, an event indicating an update at the first state store 124*a*. Subsequently, the first micro-frontend web application 120*a* is executed based on the updated state information 128*a* in the first state store 124*a*.

FIG. 10 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, RAM 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, USB interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as CDMA, global system for mobile communications (GSM), LTE, WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk-based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method implemented in a customer relationship management (CRM) system to provide efficient state information sharing between micro-frontend web applications across multiple tabs of a single web browser, the method comprising:

instantiating, by an application associated with a parent tab of a web browser on a computer system, a child tab in the web browser, wherein each of the parent tab and the child tab comprises a state-sharing application, at least one micro-frontend web application that implements a CRM operation, and an individual state store for storage of state information associated with a specific customer account, wherein the instantiating comprises:

transmitting, by the parent state-sharing application associated with the parent tab to the child tab, the state information associated with the specific customer account stored in the parent state store associated with the parent tab;

receiving, by a child state-sharing application associated with the child tab, the state information;

storing, by the child state-sharing application, the received state information in the child state store associated with the child tab;

displaying, via a user interface (UI) of the computer system, the parent tab and the child tab simultaneously within the web browser, wherein each of the parent tab and the child tab includes one or more interactive areas associated with the at least one micro-frontend web application of the respective tab;

detecting, by the parent state-sharing application, an update in the state information at the parent state store;

transmitting, by the parent state-sharing application to the child tab, based on the detected update, updated state information from the parent tab's state store;

receiving, by the child state-sharing application from the parent tab, the updated state information;

updating, by the child state-sharing application, the child state store based on the received updated state information; and executing the at least one micro-frontend web application of the child tab based at least in part on the updated state information in the child state store.

2. The method of claim 1, wherein the CRM operation is associated with at least one of a billing, a payment, a product shipment, a service fulfilment, or a customer support.

3. The method of claim 1, wherein the instantiating the child tab is in response to a user input.

4. The method of claim 1, further comprising:

monitoring, by the child state-sharing application, for the updated state information from the parent tab.

5. The method of claim 1, further comprising:

detecting, by the child state-sharing application, a second update in the state information at the child state store;

transmitting, by the child state-sharing application to the parent tab, based on the detected second update at the child state store, second updated state information from the child state store;

receiving, by the parent state-sharing application from the child tab, the second updated state information;

updating, by the parent state-sharing application, based on the received second updated state information, the parent state store; and executing at least one micro-frontend web applications of the parent tab based at least in part on the second updated state information in the parent state store.

6. The method of claim 5, further comprising:

monitoring, by the parent state-sharing application, for the second updated state information from the child tab.

7. The method of claim 1, wherein the state information stored in the parent state store comprises an attribute of the specific customer account, and wherein the detecting the update in the state information at the parent state store is associated with an update to the attribute of the specific customer account.

8. The method of claim 1, wherein the displaying the parent tab and the child tab simultaneously comprises:

displaying, via a first display device of the computer system, the parent tab; and displaying, via a second display device of the computer system different than the first display device, the child tab while displaying the parent tab in the first display device.

9. The method of claim 1, wherein each of the parent tab and the child tab comprises a plurality of micro-frontend web applications, and each of the plurality of micro-frontend web applications of the parent tab and the child tab corresponds to a different web page hosted on one or more servers of the CRM system.

10. A system used for customer relationship management (CRM) to provide efficient state information sharing between micro-frontend web applications across multiple tabs of a single web browser, the system comprising:

a computer system comprising one or more processors and non-transitory memory storing instructions that, when executed by the one or more processors, cause the computer system to:

instantiate, by an application associated with a parent tab of a web browser on the computer system, a child tab in the web browser, wherein each of the parent tab and the child tab comprises a state-sharing application, at least one micro-frontend web application that implements a CRM operation, and an individual state store for storage of state information associated with a specific customer account, wherein instantiating the child tab comprises:

transmit, by the parent state-sharing application associated with the parent tab to the child tab, the state information associated with the specific customer account stored in the parent state store associated with the parent tab;

receive, by a child state-sharing application associated with the child tab, the state information; and store, by the child state-sharing application, the received state information in the child state store associated with the child tab;

display, via a user interface (UI) of the computer system, the parent tab and the child tab simultaneously within the web browser, wherein each of the parent tab and the child tab includes one or more interactive areas associated with the at least one micro-frontend web application of the respective tab;

detect, by the parent state-sharing application, an update in the state information at the parent state store;

transmit, by the parent state-sharing application to the child tab, based on the detected update, updated state information from the parent state store;

receive, by the child state-sharing application from the parent tab, the updated state information;

update, by the child state-sharing application, the child state store based on the received updated state information; and execute the at least one micro-frontend web application of the child tab based at least in part on the updated state information in the child state store.

11. The system of claim 10, wherein the CRM operation is associated with at least one of a billing, a payment, a product shipment, a service fulfilment, or a customer support.

12. The system of claim 10, wherein the instantiation of the child tab is in response to a user input.

13. The system of claim 10, wherein the instructions, when executed by the one or more processors, further cause the computer system to:

monitor, by the child state-sharing application, for the updated state information from the parent tab.

14. The system of claim 10, wherein the instructions, when executed by the one or more processors, further cause the computer system to:

detect, by the child state-sharing application, a second update in the state information at the child state store;

transmit, by the child state-sharing application to the parent tab, based on the detected second update at the child state store, second updated state information from the child state store;

receive, by the parent state-sharing application from the child tab, the second updated state information;

update, by the parent state-sharing application, based on the received second updated state information, the parent state store; and execute at least one micro-frontend web application of the parent tab based at least in part on the second updated state information in the parent state store.

15. A non-transitory computer-readable medium storing instructions that, when executed by one or more processors of a computer system, cause the computer system to perform operations for providing efficient state information sharing between micro-frontend web applications across multiple tabs of a single web browser in connection with customer relationship management (CRM), the operations comprising:

instantiating, by an application associated with a parent tab of a web browser on the computer system, a child tab in the web browser, wherein each of the parent tab and the child tab comprises a state-sharing application, at least one micro-frontend web application that implements a CRM operation, and an individual state store for storage of state information associated with a specific customer account, wherein the instantiating comprises:

transmitting, by the parent state-sharing application associated with the parent tab to the child tab, the state information associated with the specific customer account stored in the parent state store associated with the parent tab;

receiving, by a child state-sharing application associated with the child tab, the state information; and storing, by the child state-sharing application, the received state information in the child state store associated with the child tab;

displaying, via a user interface (UI) of the computer system, the parent tab and the child tab simultaneously within the web browser, wherein each of the parent tab and the child tab includes one or more interactive areas associated with the at least one micro-frontend web application of the respective tab;

detecting, by the parent state-sharing application, an update in the state information at the parent state store;

transmitting, by the parent state-sharing application to the child tab, based on the detected update, updated state information from the parent state store;

receiving, by the child state-sharing application from the parent tab, the updated state information;

updating, by the child state-sharing application, the child state store based on the received updated state information; and executing the at least one micro-frontend web application of the child tab based at least in part on the updated state information in the child state store.

16. The non-transitory computer-readable medium of claim 15, wherein the operations further comprise:

monitoring, by the parent state-sharing application, for second updated state information from the child tab.

17. The non-transitory computer-readable medium of claim 15, wherein the state information stored in the parent state store comprises an attribute of the specific customer account, and wherein detecting the update in the state information at the parent state store is associated with an update to the attribute of the specific customer account.

18. The non-transitory computer-readable medium of claim 15, wherein displaying the parent tab and the child tab simultaneously comprises:

displaying, via a first display device of the computer system, the parent tab; and displaying, via a second display device of the computer system different than the first display device, the child tab while displaying the parent tab in the first display device.

19. The non-transitory computer-readable medium of claim 9, wherein each of the parent tab and the child tab comprises a plurality of micro-frontend web applications, and each of the plurality of micro-frontend web applications of the parent tab and the child tab corresponds to a different web page hosted on one or more servers used for CRM.

20. The non-transitory computer-readable medium of claim 15, wherein the CRM operation is associated with at least one of a billing, a payment, a product shipment, a service fulfilment, or a customer support.

* * * * *